United States Patent
Steedman Henderson et al.

(10) Patent No.: US 11,210,306 B2
(45) Date of Patent: *Dec. 28, 2021

(54) DIALOGUE SYSTEM, A METHOD OF OBTAINING A RESPONSE FROM A DIALOGUE SYSTEM, AND A METHOD OF TRAINING A DIALOGUE SYSTEM

(71) Applicant: PolyAI Limited, London (GB)

(72) Inventors: Matthew Steedman Henderson, Singapore (SG); Pei-Hao Su, London (GB); Tsung-Hsien Wen, London (GB); Inigo Casanueva Perez, London (GB); Nikola Mrksic, London (GB); Samuel John Coope, London (GB); Ivan Vulic, London (GB)

(73) Assignee: PolyAI Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/137,722

(22) Filed: Dec. 30, 2020

(65) Prior Publication Data

US 2021/0141799 A1   May 13, 2021

Related U.S. Application Data

(63) Continuation of application No. 16/709,529, filed on Dec. 10, 2019.

(30) Foreign Application Priority Data

Nov. 8, 2019 (GB) ...................... 1916307

(51) Int. Cl.
*G06F 16/2457* (2019.01)
*G06N 3/08* (2006.01)
(Continued)

(52) U.S. Cl.
CPC ...... *G06F 16/24578* (2019.01); *G06F 16/243* (2019.01); *G06N 3/0454* (2013.01); *G06N 3/08* (2013.01)

(58) Field of Classification Search
CPC ... G06F 16/24578; G06F 16/243; G06N 3/08; G06N 3/0454
See application file for complete search history.

(56) References Cited

U.S. PATENT DOCUMENTS 10,445,356 B1   10/2019   Mugan et al.
10,482,183 B1   11/2019   Vargas et al.
(Continued)

OTHER PUBLICATIONS

Metamind; "Introduction to Salesforce Einstein Vision" available as of Apr. 3, 2020 at https://metamind.readme.io/docs/predictive-vision-service-terminology; pp. 1-194 (in 3 parts).
(Continued)

*Primary Examiner* — Etienne P Leroux
(74) *Attorney, Agent, or Firm* — Bracewell LLP; Christopher L. Drymalla

(57) ABSTRACT

A method of obtaining a response to a query inputted by a user, the method comprising: receiving a user inputted query; representing the user inputted query as a sequence of embedding vectors using a first model; encoding the sequence of embedding vectors to produce a context vector using a second model; retrieving responses with associated response vectors; scoring response vectors against the context vector, wherein the scoring is a measure of the similarity between the context vector and a response vector; and outputting the responses with the closest response vectors, wherein the first model is configured to segment a user inputted query into a sequence of units from a vocabulary of units and represent each unit in the sequence as an embedding vector, wherein at least one of the units in the vocabulary is an incomplete word, and wherein the first model
(Continued)

comprises parameters that are stored using eight bits per parameter; and wherein the second model has been trained using corresponding queries and responses such that an encoding is used that maximises the similarity between the response vector and context vector for a corresponding query and response.

20 Claims, 14 Drawing Sheets

(51) Int. Cl.
    *G06N 3/04*         (2006.01)
    *G06F 16/242*     (2019.01)

(56) References Cited

U.S. PATENT DOCUMENTS

| | | | |
|---|---|---|---|
| 2009/0176198 A1* | 7/2009 | Fife | G09B 7/02 434/353 |
| 2019/0188295 A1* | 6/2019 | Sirotkovic | G06N 3/0445 |
| 2020/0097544 A1* | 3/2020 | Alexander | G06N 3/0454 |
| 2020/0372025 A1 | 11/2020 | Yoon et al. | |

OTHER PUBLICATIONS

Michel, Paul et al.; "Are Sixteen Heads Really Better Than One?" arXiv:1905.10650v3 [cs.CL] Nov. 4, 2019; pp. 1-13.
Microsoft Azure; "LUIS (Language Understanding)" available as of Apr. 3, 2020 at https://www.luis.ai/home; p. 1.
Mirzadeh, Seyed Iman et al.; "Improved Knowledge Distillation via Teacher Assistant" arXiv:1902.03393v2 [cs.LG] Dec. 17, 2019; pp. 1-11.
Mrksic, Nikola et al.; "Multi-domain Dialog State Tracking using Recurrent Neural Networks" 53rd Annual Meeting of the Association for Computational Linguistics, Jul. 26-31, 2015, Beijing; pp. 794-799.
Mrksic, Nikola et al.; "Semantic Specialization of Distributional Word Vector Spaces using Monoligual and Cross-Lingual Constraints" Transactions of the Association for Computational Linguistics, vol. 5, published Sep. 2017; pp. 309-324.
Narang, Sharan et al.; "Mixed Precision Training" Published as a conference paper at ICLR 2018; pp. 1-12.
Nvidia; "Training With Mixed Precision: User Guide" Sep. 2019; pp. 1-42.
Pereyra, Gabriel et al.; "Regularizing Neural Networks by Penalizing Confident Output Distributions" arXiv:1701.06548v1 [cs.NE] Jan. 23, 2017; pp. 1-12.
Radford, Alec et al.; "Improving Language Understanding by Generative Pre-Traning" Preprint. Work in Progress, OpenAI, 2018; pp. 1-12.
Radford, Alec et al.; "Language Models are Unsupervised Multitask Learners" OpenAI Blog, 1(8) 2019; pp. 1-24.
Ramadan, Osman et al.; "Large-Scale Multi-Domain Belief Tracking with Knowledge Sharing" Proceedings of the 56the Annual Meeting for the Association for Computational Linguistics (Short Papers), Melbourne, Jul. 15-20, 2018; pp. 432-437.
Raux, Antoine et al.; "Let's Go: Improving Spoken Dialog Systems for the Elderly and Non-natives" EUROSPEECH 2003—Geneva; pp. 753-756.
Sanh, Victor et al.; "DistilBERT, a distilled version of BERT: smaller, faster, cheaper and lighter" arXiv:1910.01108v2 [cs.CL] Oct. 16, 2019; pp. 1-5.
Schuster, Mike et al.; "Japanese and Korean Voice Search" ICASSP 2012; pp. 5149-5152.
Schwartz, Roy et al.; "Green AI" arXiv:1907.10597v3 [cs.CY] Aug. 13, 2019; pp. 1-12.
Sennrich, Rico et al.; "Neural Machine Translation of Rare Words with Subword Units" Proceedings of the 54th Annual Meeting of the Association for Computational Linguistics, Berlin, Aug. 7-12, 2016; pp. 1715-1725.
Serban, Iulian V. et al.; "Building End-to-End Dialogue Systems Using Generative Hierarchical Neural Network Models" Department of Computer Science and Operations Network, University de Montreal, Montreal, 2016; pp. 3776-3783.
Serban, Iulian Vlad et al.; "A Hierarchical Latent Variable Encoder-Decoder Model for Generating Dialogues" Proceedings of the Thirty-First AAAI Conference on Artificial Intelligence (AAAI-17), 2017; pp. 3295-3301.
Shaw, Peter et al.; "Self-Attention with Relative Position Representatives" Proceedings of NAACL-HLT 2018, New Orleans, Jun. 1-6, 2018; pp. 464-468.
Shen, Sheng et al.; "Q-BERT: Hessian Based Ultra Low Precision Quantization of BERT" arXiv:1909.05840v2 [cs.CL] Sep. 25, 2019; pp. 1-15.
Smit, Peter et al.; "Morfessor2.0: Toolkit for statistical morphological segmentation" Proceedings of the Demonstrations at the 14th Conf. of the European Chapter of the Assn for Computational Linguistics, Gothenburg, Apr. 26-30, 2014; pp. 21-24.
Song, Yiping et al.; "An Ansemble of Retrieval-Based and Generation-Based Human-Computer Conversation Systems" Proceedings of the 27th International Joint Conference on Artificial Intelligence (IJCAI-18), 2018; pp. 4382-4388.
Strubell, Emma et al.; "Energy and Policy Considerations for Deep Learining in NLP" Proceedings of the 57th Annual Meeting of the Association for Computational Linguistics, Florence, Jul. 28-Aug. 2, 2019; pp. 3645-3650.
Szegedy, Christian et al.; "Rethinking the Inception Architecture for Computer Vision" CVPR Open Access version, provided by the Computer Vision Foundation, 2019; pp. 2818-2826.
Tang, Raphael et al.; "Distilling Task-Specific Knowledge from BERT into Simple Neural Networks" arXiv:1903.12136v1 [cs.CL] Mar. 28, 2019; pp. 1-8.
Tao, Chongyang et al.; "Multi-Representation Fusion Network for Multi-turn Response Selection in Retrieval-based Chatbots" WSDM '19, Feb. 11-15, 2019, Melbourne; pp. 267-275.
Twilio; "Twilio Autopilot: Build, train, and deploy AI-powered bots for your contact center." available as of Apr. 3, 2020 at https://www.twilio.com/autopilot; pp. 1-11.
Vaswani, Ashish et al.; "Attention Is All You Need" 31st Conference on Neural Information Processing Systems (NIPS 2017), Long Beach; pp. 1-11.
Vaswani, Ashish et al.; "Tensor2Tensor for Neural Machine Translation" Proceedings of AMTA 2018, vol. 1:MT Research Track, Boston, Mar. 17-21, 2018; pp. 193-199.
Vig, Jesse et al.; "Compraison of Transfer-Learning Approaches for Response Selection in Multi-Turn Conversations" Association for the Advancement of Artificial Intelligence, 2019; pp. 1-7.
Vinyals, Oriol et al.; "A Neural Conversational Model" Proceedings of the 31st International Conference on Machine Learning, Lille, 2015; pp. 1-8.
Vlasov, Vladimir et al.; "Dialogue Transformations" arXiv:1910.00486v2 [cs.CL] Nov. 18, 2019; pp. 1-7.
Wan, Mengting et al.; "Modeling Ambiguity, Subjectivity, and Diverging Viewpoints in Opinion Question Answering Systems" arXiv:1610.08095v1 [cs.IR] Oct. 25, 2016; pp. 1-10.
Wang, Hao et al.; "A Dataset for Research on Short-Text Conversation" Conference on Empirical Methods in Natural Language, Seattle, Oct. 18-21, 2013; pp. 935-945.
Wen, Tsung-Hsien et al.; "A Network-based End-to-End Trainable Task-oriented Dialogue System" 15th Conference of the European Chapter of the Association for Computational Linguistics, vol. 1, Valencia, Apr. 3-7, 2017; pp. 438-449.
Wen, Tsung-Hsien et al.; "Latent Intention Dialogue Models" Proceedings of the 34th International Conference on Machine Learning, Sydney, PMLR 70, 2017; pp. 1-10.
Weston, Jason et al.; "Retrieve and Refine: Improved Sequence Generation Models For Dialogue" 2nd Int'l Workshop on Search-Oriented Conversational AI, Brussels, Oct. 31, 2018; pp. 87-92.
Wieting, John et al.; "CHARAGRAM: Embedding Words and Sentenced via Character n-grams" arXiv:1607.02789v1 [cs:CL] Jul. 10, 2016; pp. 1-14.
Wikipedia; "IEEE 754" available as of Apr. 3, 2020 at: https://en.wikipedia.org/wiki/IEEE_754; pp. 1-12.

(56) References Cited

OTHER PUBLICATIONS

Williams, Jason D.; "A critical analysis of two statistical spoken doalog systems in public use" IEEE Spoken Language Technology Workshop, Dec. 2012; pp. 1-6.

Williams, Jason D.; "Web-style ranking and SLU combination for dialog state tracking" Proceedings of the SIGDIAL 2014 Conference, Philadelphia, Jun. 18-20, 2014; pp. 282-291.

Wochinger, Tobias; "Rasa NLU in Depth: Part 1—Intent Classification" Feb. 21, 2019; available at https://blog.rasa.com/rasa-nlu-in-depth-part-1-intent-classification/; pp. 1-13.

Wu, Yonghui et al.; "Google's Neural Machine Translation System: Bridging the Gap between Human and Machine Translation" arXiv:1609.08144v2 [cs:CL] Oct. 8, 2016; pp. 1-23.

Wu, Yu et al.; "Sequential Matching Network: A New Architectur for Multi-turn Response Selctionin Retrieval-Based Chatbots" Proceedings of the 55th Annual Mtg of the Assn for Computational Linguistics, Vancouver, Jul. 30-Aug. 4, 2017; pp. 496-505.

Yang, Yinfei et al.; "Learning Semantic Textual Similarity from Conversations" 3rd Workshop on Representation Learning for NLP, Melbourne, Jul. 20, 2018; pp. 164-174.

Yoshino, Koichiro et al.; "Dialog System Technolgy Challenge 7" arXiv:1901.03461v1 [cs.CL] Jan. 11, 2019; pp. 1-10.

Young, Steve; "Still Talking to Machines (Cognitively Speaking)" Cambridge University Engineering Department, In Proceedings of INTERSPEECH, 2010; pp. 1-10.

Zafrir, Ofir et al.; "Q8BERT: Quantized 8Bit BERT" arXiv:1910.06188v2 [cs.CL] Oct. 17, 2019; pp. 1-5.

Zeiler, Matthew D.; "ADADELTA: An Adaptive Learning Rate Method" arXiv:1212.5701v1 [cs.LG] Dec. 22, 2012; pp. 1-6.

Al-Rfou, Rami et al.; "Conversational Contextual Cues: The Case of Personalization and History for Response Ranking" arXiv:1606.00372v1 [cs:CL], Jun. 1, 2016; pp. 1-10.

Bhandare, Aishwarya et al.; "Efficient 8-Bit Quantization of Transformer Neural Machine Language Translation Model" arXiv:1906.00532v2 [cs:LG] Jun. 7, 2019; pp. 1-10.

Bojanowski, Piotr et al.; "Enriching Word Vectors with Subword Information" Transactions of the Association for Computational Linguistics, vol. 5, 2017; pp. 135-146.

Bordes, Antoine et al.; "Learning End-to-End Goal-Oriented Dialogue" In Proceedings of ICLR, 2017; pp. 1-15.

Boussaha, Basma El Amel et al.; "Deep Retrieval-Based Dialogue Systems: A Short Review" arXiv:1907.12878v1 [cs:CL] Jul. 30, 2019; pp. 1-7.

Braun, Daniel et al.; "Evaluating Natural Language Understanding Services for Conversational Question Answering Systems" Proceedings of the SIGDIAL 2017 Conference, Saarbrucken, Aug. 15-17, 2017; pp. 174-185.

Budzianowski, Pawel et al.; "MultiWOZ—A Large-Scale Multi-DomainWizard-of-Oz Dataset for Task-Oriented Dialogue Modelling" Proceedings of the 2018 Conf. on Empirical Methods in Natural Language Processing, Brussels, Oct. 31-Nov. 4, 2018; pp. 5016-5026.

Cer, Daniel et al.; "Universal Sentence Encoder for English" Proceedings of the 2018 Conference on Empirical Methods in Natural Language & Processing, Brussels, Oct. 31-Nov. 4, 2018; pp. 169-174.

Chaudhuri, Debanjan et al.; "Improving Response Selection in Multi-turn Dialogue Systems by Incorporating Domain Knowledge" 22nd Conference on Computational Natural Language Learning, Oct. 31-Nov. 1, 2018; pp. 497-507.

Chen, Hongshen et al.; "A Survey on Dialogue Systems: Recent Advances and New Frontiers" arXiv:1711.01731v3 [cs:CL] Jan. 11, 2018; pp. 1-13.

Chidambaram, Muthuraman et al.; "Learning Cross-Lingual Sentence Representations via a Multi-task Dual-Encoder Model" Proceedings of the 4th Workshop on Representation Learning for NLP, Florence, Aug. 2, 2019; pp. 250-259.

Cotterell, Ryan et al.; "Labeled Morphological Segmentation with Semi-Markov Models" Proceedings of the 19th Conference on Computational Language & Learning, Beijing, Jul. 30-31, 2015; pp. 164-174.

Deerwester, Scott et al.; "Indexing by Latent Semantic Analysis" Journal of the American Society for Information Science, 1990, 41(6); pp. 391-407.

Devlin, Jacob et al.; "BERT: Pre-training of Deep Bidirectional Transformers for Language Understanding" Proceedings of NAACL-HLT, Minneapolis, Jun. 2-7, 2019; pp. 4171-4186.

Dialogflow; "Build natural and rich conversational experiences" available as of Apr. 3, 2020 at: https://dialogflow.com; pp. 1-5.

Du, Wenchao et al.; "Data Augmentation for Neural Online Chat Response Selection" 2nd Int'l Workshop on Search-Oriented Conversational AI, Brussels, Oct. 31, 2018; pp. 52-58.

El Asri, Layla et al.; "Frames: A Corpus for Adding Memory to Goal-Oriented Dialogue Systems" In Proceedings of SIGDIAL, pp. 207-219.

Eric, Mihail et al.; "MultiWOZ 2.1: A Consolidated Multi-Domain Dialogue Dataset with State Corrections and State Tracking Baselines" arXiv:1907.01669v4, Dec. 3, 2019; pp. 1-7.

Fadhil, Ahmed et al.; "Designing for Health Chatbots" arXiv:1902.09022v1 [cs:CY] Feb. 24, 2019; pp. 1-20.

Fraser, Jamie et al.; "Spoken Conversational AI in Video Games—Emotional Dialogue Management Increases User Engagement" IVA '18, Nov. 5-8, 2018, Sydney, NSW, Australia; pp. 179-184.

Gage, Philip; "A New Algorithm for Data Compression" The C User Journal, 1994; pp. 1-14.

Gunasekara, Chulaka et al.; "DSTC7 Task 1: Noetic End-to-End Response Selection" Association for the Advancement of Artificial Intelligence, 2019; pp. 1-7.

Han, Song et al.; "Deep Compression: Compressing Deep Neural Networks with Pruning, Trained Quantization and Huffman Coding" arXiv:1510.00149v5 [cs.CV] Feb. 15, 2016; pp. 1-14.

Heinzerling, Benjamin et al.; "BPEmb: Tokenization-free Pretrained Subword Embeddings in 275 Languages" arXiv:1710.02187v1 [cs:CL] Oct. 5, 2017; pp. 1-5.

Hemphill, Charles T. et al.; "The ATIS Spoken Language Systems Pilot Corpus" In Proceedings of the Workshop on Speech and Natural Langugage, HLT '90; pp. 96-101.

Henderson, Matthew et al.; "A Repository of Conversational Datasets" arXiv:1904.06472v2 [cs:CL] May 29, 2019; pp. 1-10.

Henderson, Matthew et al.; "Efficient Natural Language Response Suggestion for Smart Reply" arXiv:1705.00652v1 [cs:CL], May 1, 2017; pp. 1-15.

Henderson, Matthew et al.; "The Second Dialog State Tracking Challenge" Proceedings of the SIGDIAL Conference, Jun. 18-20, 2014; Philadelphia; pp. 263-272.

Henderson, Matthew et al.; "Training Neural Response Selection for Task-Oriented Dialogue Systems" arXiv:1906.01543v2 [cs:CL] Jun. 7, 2019; pp. 1-13.

Henderson, Matthew et al.; "Word-Based Dialog State Tracking with Recurrent Neural Networks" Proceedings of the SIGDIAL Conference, Jun. 18-20, 2014; Philadelphia; pp. 263-272.

Hendrycks, Dan et al.; "Gaussian Error Linear Units (GELUs)" arXiv:1606.08415v3 [cs:LG] Nov. 11, 2018; pp. 1-9.

Humeau, Samuel et al.; "Poly-encoders: Transformer Architectures and Pre-training Strategies for Fast and Accurate Multi-sentence Scoring" arXix:1905.01969v2 [cs.CL] Aug. 19, 2019; pp. 1-13.

IBM; "Watson Natural Language Classifier" available as of Apr. 3, 2020 at https://www.ibm.com/watson/services/natural-language-classifier/; pp. 1-16.

Jacob, Benoit et al.; "Quantization and Training of Neural Networks for Efficient Integer-Arithmetic-Only Inference" arXiv:1712.05877v1 [cs:LG] Dec. 15, 2017; pp. 1-14.

Ji, Zongcheng et al.; "An Information Retrieval Approach to Short Text Conversation" xrXiv:1408.6988v1 [cs.IR] Aug. 29, 2014; pp. 1-21.

Kannan, Anjuli et al.; "Smart Reply: Automated Response Suggestion for Email" In Proceedings of KDD, 2016; pp. 955-964.

Kudo, Taku et al.; "SentencePiece: A simple and language independent subword tokenizer and detokenizer for Neural Text Pro-

(56) References Cited

OTHER PUBLICATIONS cessing" Proceedings of the 2018 Conf. on Empirical Methods in Natural Language Processing Brussels, Oct. 31-Nov. 1, 2018; pp. 66-71.
Kudo, Taku; "Subword Regularization: Improving Neural Network Translation Models with Multiple Subword Candidates" arXiv:1804.10959v1 [cs:CL] Apr. 29, 2018; pp. 1-10.
Lan, Zhenzhong et al.; "Albert: A Lite BERT for Self-Supervised Learning of Language Representations" arXiv:1909.11942v4 [cs.CL] Jan. 10, 2020; pp. 1-17.
Laranjo, Liliana et al.; "Conversational agents in healthcare: a systematic review" Journal of the American Medical Informatics Association, 25(9), 2018, pp. 1248-1258.
Li, Jiwei et al.; "A Diversity-Promoting Objective Function for Neural Conversation Models" Proceedings of NAACL-HLT, Jun. 12-17, 2016, San Diego; pp. 110-119.
Li, Xiujun et al.; "End-to-End Task-Completion Neural Dialogue Systems" 8th International Joint Conference on Natural Language Processing, Taipei, Nov. 27-Dec. 1, 2017; pp. 733-743.
Liu, Bing et al.; "Dialogue Learning with Human Teaching and Feedback in End-to-End Trainable Task-Oriented Dialogue Systems" Proceedings of NAACL-HLT 2018, New Orleans, Louisiana, Jun. 1-6, 2018; pp. 2060-2069.
Liu, Fei et al.; "Gated End-to-End Memory Networks" 15th Conference of the European Chapter of the Association for Computational Linguistics, vol. 1, Valencia, Apr. 3-7, 2017; pp. 1-10.
Liu, Yinhan et al.; "RoBERTa: A Robustly Optimized BERT Pretraining Approach" arXiv:1907.11692v1 [cs.CL] Jul. 26, 2019; pp. 1-13.
Lowe, Ryan et al.; "Training End-to-End Dialogue Systems with the Ubuntu Dialogue Corpus" Dialogue & Discourse 8(1) (2017); pp. 31-65.
Manning, Christopher D. et al.; "An Introduction to Information Retrieval" Apr. 1, 2009, Online edition (c) 2009 Cambridge UP; pp. 1-581.
Mazare, Pierre-Emmanuel et al.; "Training Millions of Personalized Dialogue Agents" Proceedings of the 2018 Conference on Empirical Methods in Natural Language eProcessing, Brussels, Oct. 31-Nov. 4, 2019; pp. 2775-2779.
Mehri, Shikib et al.; "Pretraining Methods for Dialog Context Representation Learning" Proceedings of the 57th Annual Meeting of the Association for Computational Linguistics, Florence, Jul. 28-Aug. 2, 2019; pp. 3836-3845.
Zhao, Sanqiang et al.; "Extreme Language Model Compression with Optimal Subwords and Shared Projections" arXiv:1909.11687v1 [cs.CL] Sep. 25, 2019; pp. 1-11.
Zhao, Tiancheng et al.; "Rethinking Action Spaces for Reinforcement Learning in End-to-end Dialog Agents with Latent Variable Models" Proceedings of NAACL-HLT 2019, Minneapolis, Jun. 2-7, 2019; pp. 1208-1218.
Zhou, Xiangyang et al.; "Multi-Turn Response Selection for Chatbots with Deep Attention Matching Netowrk" Proceedings of the 56th Annual Meeting of the Association for Computational Linguistics, Melbourne, Jul. 15-20, 2018; pp. 1118-1127.
Zhu, Yi et al.; "A Systematic Study of Leveraging Subword Information for Learining Word Representations" Proceedings of NAACL-HLT 2019, Minneapolis, Jun. 2-7, 2019; pp. 912-932.
Extended European Search Report for Application No. 20205844.2-1231 (PN834286EP) dated Mar. 31, 2021; pp. 1-11.
Lowe, Ryan et al.; "The Ubuntu Dialogue Corpus: A Large Dataset for Research in Unstructured Multi-Turn Dialogue Systems" Proceedings of the SIGDIAL 2015 Conference, Prague, Sep. 2-4, 2015; pp. 285-294.
Tissier, Julien et al.; "Near-Lossless Binarization of Word Embeddings" arXiv:1803.09065v3 [cs.CL], Nov. 15, 2018; pp. 1-8.
Non-Final Office Action issued in U.S. Appl. No. 16/709,529 dated Nov. 9, 2021; pp. 1-17.

* cited by examiner

Figure 5(c)

```
subword_split(
"polyai develops a machine learning platform for conversational artificial intelligence.")

_poly -ai _develop -s _a _machine _learning _platform _for _conversation -al _artificial _int
elligence _.

subword_split("the subword vocab is learned over 10m reddit examples")

_the _sub -word _voca -b _is _learned _over _10m _reddit _examples subword_split("it includes 'words ' like covfefe")

_it _includes _ ' _words _ ' _like _covfefe subword_split("mockumentary, flexitarian, singlish, staycation")

_mock -ument -ary _, _flexi -tarian _, _sing -lish _, _stay -cation
```

DIALOGUE SYSTEM, A METHOD OF OBTAINING A RESPONSE FROM A DIALOGUE SYSTEM, AND A METHOD OF TRAINING A DIALOGUE SYSTEM

CROSS-REFERENCE TO RELATED APPLICATIONS

This application is based upon and claims the benefit of priority from prior United Kingdom Application number 1916307.0 filed on Nov. 8, 2019, the entire contents of which are incorporated herein by reference.

FIELD

Embodiments described herein relate to methods of obtaining a response to a query inputted by a user, methods of training response retrieval systems to provide a response to a query inputted by a user, and dialogue systems for obtaining a response to a query inputted by a user.

BACKGROUND

Response retrieval systems such as computer implemented dialogue systems or conversational user interfaces, for example chatbots or voice-based agents, are used in many applications, for example search, recommendation, booking, telephone help systems, customer service, e-banking etc.

Such dialogue systems may be constructed around rigid ontologies, where conversations are modelled as a sequence of actions that constrain slots to certain values. This method of modelling dialogue presents two main challenges. Firstly, it is difficult to collect data labelled with these explicit semantic representations. Secondly, it constrains the types of dialogue the system can support, resulting in artificial conversations, and breakdowns when the user does not understand what the system can and cannot support.

BRIEF DESCRIPTION OF FIGURES

Embodiments described herein will now be described with reference to the following figures:

FIG. 3 (b) is a schematic illustration of another example response selection performed by a dialogue system in accordance with an embodiment;

FIG. 4 (b) is a schematic illustration of a method of obtaining a response to a query inputted by a user in accordance with an embodiment;

FIG. 5 (b) is a schematic illustration of two stages used in a method of training a response retrieval system in accordance with an embodiment and a stage used in a method of obtaining a response to a query inputted by a user in accordance with an embodiment;

FIG. 5 (c) is a schematic illustration of an example of subword tokenisation performed by a method according to an embodiment;

FIG. 6 (b) is a schematic illustration of the storage requirements for a method of training a response retrieval system in accordance with an embodiment;

DESCRIPTION

Figure 1:
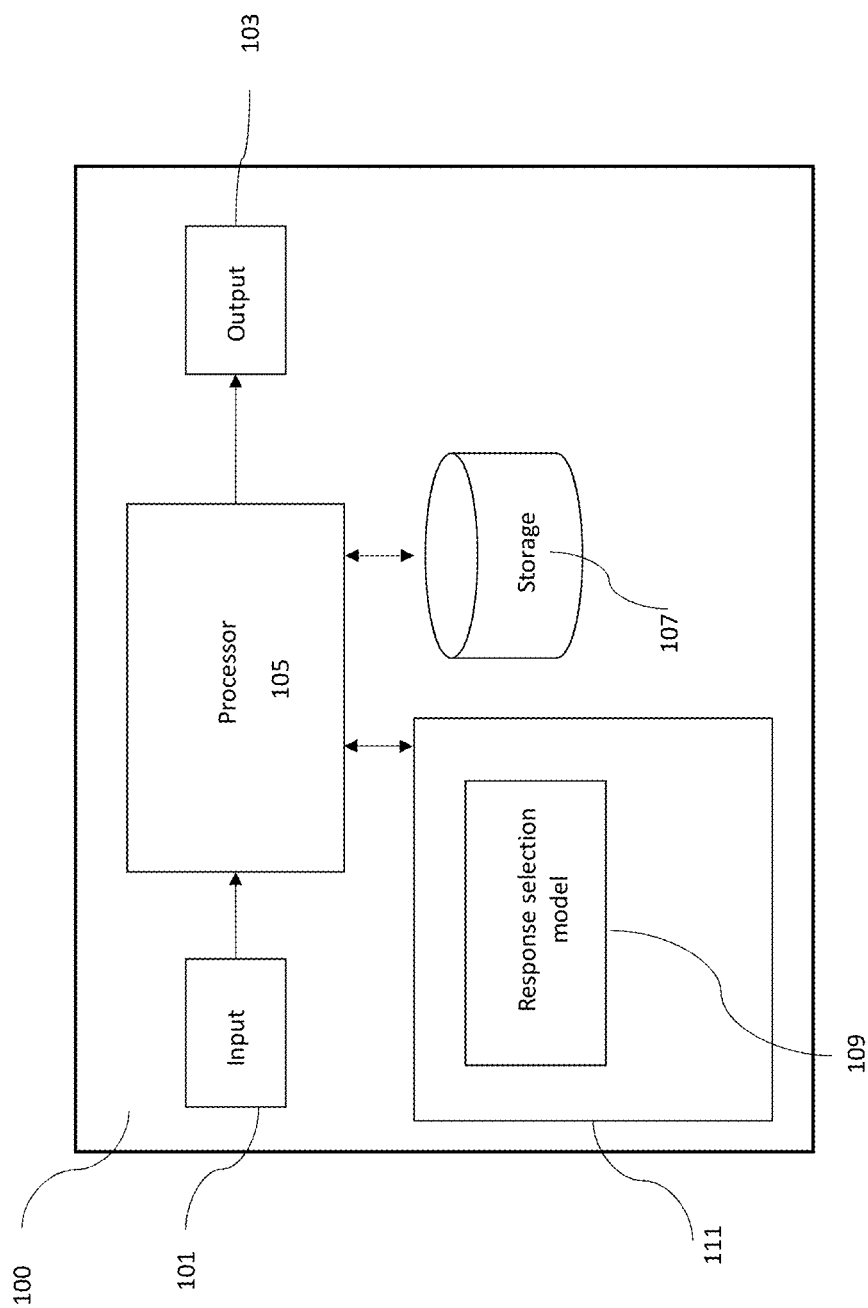
FIG. 1 is a schematic illustration of a system in accordance with an embodiment.

According to a first aspect, there is provided a method of obtaining a response to a query inputted by a user, the method comprising:

receiving a user inputted query;

representing the user inputted query as a sequence of embedding vectors using a first model;

encoding the sequence of embedding vectors to produce a context vector using a second model;

retrieving responses with associated response vectors;

scoring response vectors against the context vector, wherein the scoring is a measure of the similarity between the context vector and a response vector; and outputting the responses with the closest response vectors, wherein the first model is configured to segment the user inputted query into a sequence of units from a vocabulary of units and represent each unit in the sequence as an embedding vector, wherein at least one of the units in the vocabulary is an incomplete word, and wherein the first model comprises parameters that are stored using eight bits per parameter; and wherein the second model has been trained using corresponding queries and responses such that an encoding is used that maximises the similarity between the response vector and context vector for a corresponding query and response.

The disclosed system addresses a technical problem tied to computer technology and arising in the realm of computer networks, namely the technical problem of resource utilization. The system achieves this by providing a model which is configured to segment a user inputted query into a sequence of units from a vocabulary of units and represent each unit in the sequence as an embedding vector, wherein at least one of the units in the vocabulary is an incomplete word, and wherein the first model comprises parameters that are stored using eight bits per parameter. Quantising the stored parameters using eight bits enables the model size to be reduced. Subword representation further requires a reduced vocabulary, and therefore a reduced number of embeddings to be stored. The model is therefore memory efficient and training efficient, while maintaining performance in a response selection task. Having a smaller model in terms of the number of parameters and storage required means that the model is more memory efficient and can be stored on small devices, e.g., mobile phones or tablets, with limited memory storage for example.

In an embodiment, the user inputted query is received on a first device comprising a local memory; and the parameters of the first model and the second model are stored on the local memory.

One or more of the parameters of the second model are stored using 16 bits per parameter. In an embodiment, all of the parameters of the second model are stored using 16 bits per parameter. In an embodiment, the parameters of the first model and the second model are less than 1 GB in size. In an embodiment, there are 30 000 to 50 000 units in the vocabulary.

The parameters of the first model that are stored using eight bits per parameter are the elements of the embedding vectors. The elements of the embedding vectors representing each unit in the sequence are converted to a higher precision representation before being input to the second model.

In an embodiment, the first model is configured to segment the user inputted query by: segmenting the user inputted query into words, and matching units from the vocabulary to parts of each word, starting with the longest units.

The second model may comprise a transformer network. The second model may comprise a repeated module comprising a self-attention layer, a layer-normalization step, a feedforward neural network and a further layer-normalization step. The second model may further comprise a positional encoding layer. The second model may further comprise a multi-attention layer.

According to a second aspect, there is provided a dialogue system for obtaining a response to a query inputted by a user, the system comprising:
an input for receiving a user inputted query;
a processor, configured to:
represent the user inputted query as a sequence of embedding vectors using a first model, wherein the first model is configured to segment the user inputted query into a sequence of units from a vocabulary of units and represent each unit in the sequence as an embedding vector, wherein at least one of the units in the vocabulary is an incomplete word;
encode the sequence of embedding vectors to produce a context vector using a second model, wherein the second model has been trained using corresponding queries and responses such that an encoding is used that maximises the similarity between the response vector and the context vector for a corresponding query and response;
retrieve responses with associated response vectors;
score response vectors against the context vector wherein the scoring is a measure of the similarity between the context vector and a response vector; and
select the responses with the closest response vectors,
an output, configured to output speech or text corresponding to the selected responses; and
a local memory, configured to store a plurality of parameters of the first model using eight bits per parameter.

According to a third aspect, there is provided a method of training a response retrieval system to provide a response to a query inputted by a user, the method comprising:
providing a set of training data, wherein the training data set comprises queries and corresponding responses;
representing each query as a first sequence of vectors using a first model, wherein the first model is configured to segment an inputted query into a sequence of units from a vocabulary of units and represent each unit in the sequence as an embedding vector, wherein at least one of the units in the vocabulary is an incomplete word, and wherein the first model comprises parameters that are stored using eight bits per parameter;
encoding each first sequence of embedding vectors to produce a context vector using a second model;
representing each response as a second sequence of vectors using a third model, wherein the third model is configured to segment an inputted response into a sequence of units from the vocabulary of units and represent each unit in the sequence as an embedding vector, wherein the third model uses at least some of the parameters of the first model;
encoding each second sequence of embedding vectors to produce a response vector using a fourth model; and
jointly training the first, second, third and fourth models using the condition that the similarity between the context vector and the response vector is higher for a corresponding response and query and that the similarity between the context vector and the response vector is lower for a random response and query.

In an embodiment, at least some of the parameters of the second model are stored using a 16-bit floating point representation. In an embodiment, the parameters of the first model that are stored using eight bits per parameter and that are shared with the third model are the elements of the embedding vectors. In an embodiment, the fourth model uses at least some of the parameters of the second model.

In an embodiment, the parameters of the first model have a value between a minimum value and a maximum value, and wherein the minimum value and the maximum value are adjusted during training. In a further embodiment, the parameters of the first model have a value equal to one of 256 values equally spaced from the minimum value to the maximum value, and wherein each of the 256 values is mapped to an integer from 0 to 255 which is represented by 8 bits.

The methods are computer-implemented methods. Since some methods in accordance with embodiments can be implemented by software, some embodiments encompass computer code provided to a general purpose computer on any suitable carrier medium. The carrier medium can comprise any storage medium such as a floppy disk, a CD ROM, a magnetic device or a programmable memory device, or any transient medium such as any signal e.g. an electrical, optical or microwave signal. The carrier medium may comprise a non-transitory computer readable storage medium. According to a fourth aspect, there is provided a carrier medium comprising computer readable code configured to cause a computer to perform any of the above described methods.

FIG. 1 is a schematic illustration of a dialogue system 100 in accordance with an embodiment. The system comprises an input 101, a processor 105, a working memory 111, an output 103, and storage 107. The system 100 may be a mobile device such as a laptop, tablet computer, smartwatch, or mobile phone for example. Alternatively, the system 100 may be a computing system, for example an end-user system that receives inputs from a user (e.g. via a keyboard, screen or microphone) and provides output (e.g. via a screen or speaker), or a server that receives input and provides output over a network.

The processor 105 is coupled to the storage 107 and accesses the working memory 111. The processor 105 may comprise logic circuitry that responds to and processes the instructions in code stored in the working memory 111. In particular, when executed, a response selection model 109 is represented as a software product stored in the working memory 111. Execution of the response selection model 109 by the processor 105 will cause embodiments as described herein to be implemented.

The processor 105 also accesses the input module 101 and the output module 103. The input and output modules or interfaces 101, 103 may be a single component or may be divided into a separate input interface 101 and a separate output interface 103. The input module 101 receives a query through an input, which may be a receiver for receiving data from an external storage medium or a network, a microphone, screen or a keyboard for example. The output module 103 provides the response generated by the processor 105 to an output such as a speaker or screen, or a transmitter for transmitting data to an external storage medium or a network for example.

In an embodiment, the input provided is in the form of text or audio, and the output is provided to the user in the form of text or audio. It should be noted that the system can be configured to work with one or both of text and audio signals. Working with text interfaces (and not only audio) can allow, for example, hearing impaired and mute people to also use the system. If the input is in the form of audio, an automatic speech recognition model may be included to convert the input audio to text. Any type of speech recognition process may be used, for example, a trained speech recognition algorithm based on a neural network or Hidden Markov Model may be used. If the output is to be in the form of audio, a text to speech model is included. Any type of text to speech generation model may be used.

The system may further comprise means of communication with third-party services. For example, the system may be configured to communicate with a restaurant system when attempting to finalise a restaurant booking process (to check availability for a particular date, time, and number of people for example). The communication means may comprise a connection to a communication network for example.

The storage 107 is configured to communicate with the processor 105. The storage 107 may contain data that is used by the response selection model 109 when executed by the processor 105. As illustrated, the storage 107 is local memory that is contained in the device. Alternatively however, the storage 107 may be wholly or partly located remotely, for example, using cloud based memory that can be accessed remotely via a communication network (such as the Internet). The response selection model 109 is stored in the storage 107. For example, the response vectors and their associated responses, and various parameters of the response selection model 109 such as the embeddings and weights and bias vectors in the encoder may be stored in the storage 107.

The response selection model 109 is placed in working memory when executed. The working memory 111 of a device is limited. For example, the working memory of a mobile phone device may be limited to up to 12 GB. In another example, the working memory of a mobile phone device is 6 GB. Such devices may need to fit a number of programs, for example a number of apps into the working memory. Thus a more compact model, that can be executed with limited RAM, is desirable.

Usual procedures for the loading of software into memory and the storage of data in the storage unit 107 apply. The response selection model 109 can be embedded in original equipment, or can be provided, as a whole or in part, after manufacture. For instance, the response selection model 109 can be introduced, as a whole, as a computer program product, which may be in the form of a download, or can be introduced via a computer program storage medium, such as an optical disk. Alternatively, modifications to existing dialogue manager software can be made by an update, or plug-in, to provide features of the above described embodiment.

While it will be appreciated that the above embodiments are applicable to any computing system, the example computing system illustrated in FIG. 1 provides means capable of putting an embodiment, as described herein, into effect.

Figure 2:
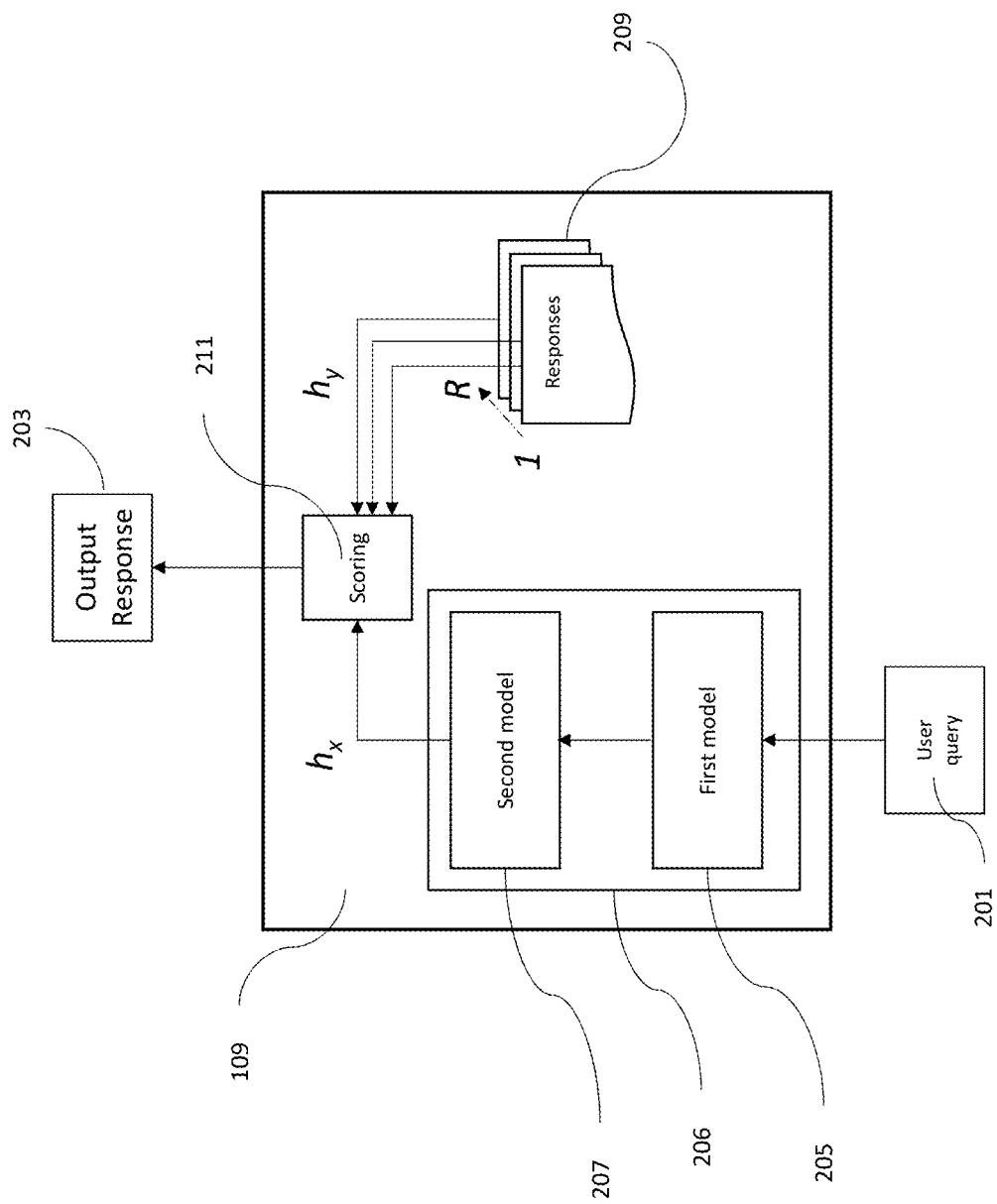
FIG. 2 is a schematic illustration of the functional components of a response selection model which is used in a dialogue system in accordance with an embodiment.

FIG. 2 is a schematic illustration of the functional components of a response selection model 109 which is used in a dialogue system in accordance with an embodiment. The model is used for the task of conversational response selection. In a response selection task, given an input sentence, the goal is to identify the relevant response from a large pool of stored candidate responses. The response selection model 109 receives one input (a sentence or several sentences provided in natural language through speech or text by a user), and it aims to select the most relevant responses out of R stored potential responses. In an embodiment, R may be a large number, for example >100M potential responses may be stored, or >1 billion responses can be stored. The output of the model is a numerical score that represents the fitness of each response to the provided input, and a ranked list may be created based on the numerical scores of all R (input, response) pairs. The response is then selected based on the list. For example, the response which is highest on the list may be selected, or an alternative method of selection may be used.

The response model 109 receives user query 201 in the form of text as input. If the user input is originally in the form of audio, an automatic speech recognition model is included to convert the input audio to text.

The user query 201 is represented by a sequence of vectors, also referred to as embeddings, by a first model 205. The operation of an example of a first model 205 will be described further below in relation to FIG. 5($a$). For a given user input, the first model 205 represents the input as a sequence of embeddings. Each embedding is vector having a dimension D. In an embodiment, the dimension is 512. In another embodiment, the dimension is 768. In a further embodiment, D is 256.

Each embedding represents one of V units in a vocabulary, or one of K special out of vocabulary units which will be described later. The vocabulary comprises V units which are used to represent language. The vocabulary comprises enough units in order to suitably capture language. In an example, V may be in the range of 30,000-50,000. The embeddings for each unit of the vocabulary may be stored in the storage 107, and placed in the working memory 111 as part of the model when the model is executed. The memory required to store the V units increases with the size of the vocabulary V.

Each element of the vectors is stored using P bits. Therefore, the memory requirement for storing the embeddings for a vocabulary of V units is at least=V×D×P bits. The embeddings with dimension D of the first model are stored using P=8 bits per element. Each element of the embeddings is stored using a computer number format that occupies 8 bits in computer memory. 8 bits are used to define 256 equally spaced values from a min value to a max value. Each of the integer numbers from 0 to 255 may be represented by the 8 bit format. Each integer number from 0 to 255 maps to a higher precision format value between the min and max value. This will be explained in further detail below.

Various parameters of the second model (e.g. weights of the model) may also be stored using a floating-point computer number format that occupies 16 bits or 32 bits in computer memory. According to an example, the floating-point numbers may follow the IEEE 754 16-bit half-precision and the 32-bit full precision formats respectively.

The sequence of embeddings output from the first model is converted to the higher precision format values. Each element of each embedding is converted from the 8-bit representation to the actual value in the higher precision format. How this is done will be explained below. The sequence of embeddings is then inputted to a second model 207. The second model 207 comprises a trained model, and the operation and training of the second model 207 will be described further below. The second model 207 is trained to encode the sequence of embeddings representing a user query 201 into an output vector referred to as a context vector and shown as $h_X$ in the figure. In use, the second model receives a sequence of token embeddings D from the first model and outputs a context vector $h_X$. Parameters of the second model may be stored in the storage 107 for example, and moved to the working memory 111 to be executed.

The first model 205 and second model 207 together may be referred to as an encoder 206, the encoder 206 being configured to encode the user query 201 into a context vector $h_X$.

The context vector $h_X$ and a response vector $h_Y$ are compared in the scoring stage 211, wherein the scoring is a measure of the similarity between the context vector and a response vector. The scoring is used to select the output response, for example the response with the closest response vector may be output. In an embodiment, the similarity between the context and response vectors is determined using a similarity measure such as the cosine similarity.

The second model 207 has been trained so that an input query produces a context vector which is similar to a response vector $h_Y$ for a suitable response. As will be described in more detail below, the second model 207 has been trained using corresponding queries and responses such that an encoding is used that maximises the similarity between the response vector and context vector for a corresponding query and response. In an example, the queries and responses are selected from free text entries into social networking engines, restaurant review sites et cetera. In an example, a fully anonymized Reddit data set is used, comprising around 3.7B of comments in its conversational threads.

FIG. 2 shows R responses stored in a response database 209, with corresponding response vectors $h_Y$. The database 209 represents a set of candidate responses from which the dialogue system 109 selects the one or more best responses. Each of the R responses has an associated response vector $h_Y$. In an example, the database 209 comprises pairs of a response (e.g. "The restaurant serves Japanese food") and vector $h_Y$. The database 209 is stored in the storage 107, and moved to the working memory 111 during execution.

The R possible response vectors $h_Y$ have been generated during a training stage which will be described further below. In use, each of the R response vectors $h_Y$ is compared against the context vector $h_X$ for a particular user query in scoring module 211. The model 109 then outputs one or more suitable responses from the collection of R responses.

Figure 3:
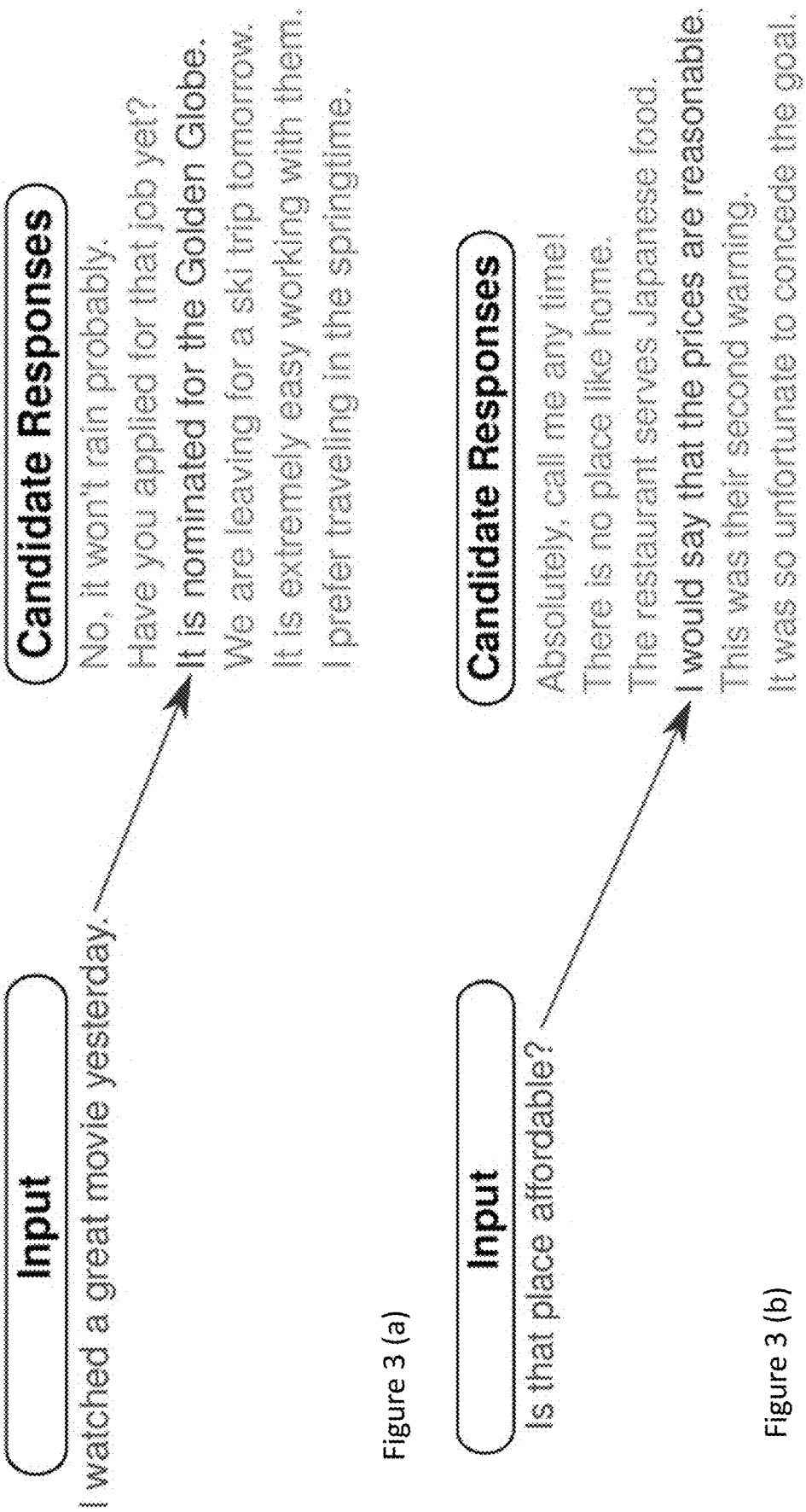
FIG. 3 (a) is a schematic illustration of an example response selection performed by a dialogue system in accordance with an embodiment.

FIG. 3 (a) shows an example of response selection which may be performed by a dialogue system in accordance with an embodiment. A user provides an input "I watched a great movie yesterday". In this example, the input is a statement, but is still referred to as a query. The term query is used generally to refer to the user input. The response selection model 109 then identifies the appropriate response "It is nominated for the Golden Globe" from the collection of stored R responses, where for illustrative purposes R=6, but in practice R may be a large number. FIG. 3 (b) shows another example of response selection which may be performed by a dialogue system in accordance with an embodiment. A user provides an input "Is that place affordable?". The response selection model 109 then identifies the appropriate response "I would say that prices are reasonable." from the collection of stored R responses, where for illustrative purposes R=6, but in practice R may be a large number.

Figure 4:
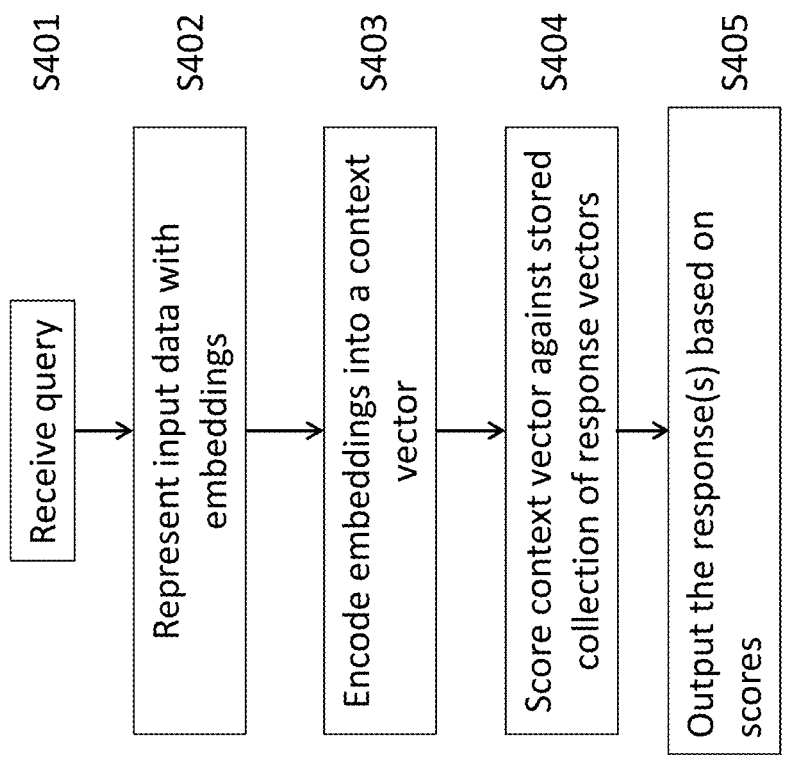
FIG. 4 (a) is a schematic illustration of a method of obtaining a response to a query inputted by a user in accordance with an embodiment.
Figure 4:
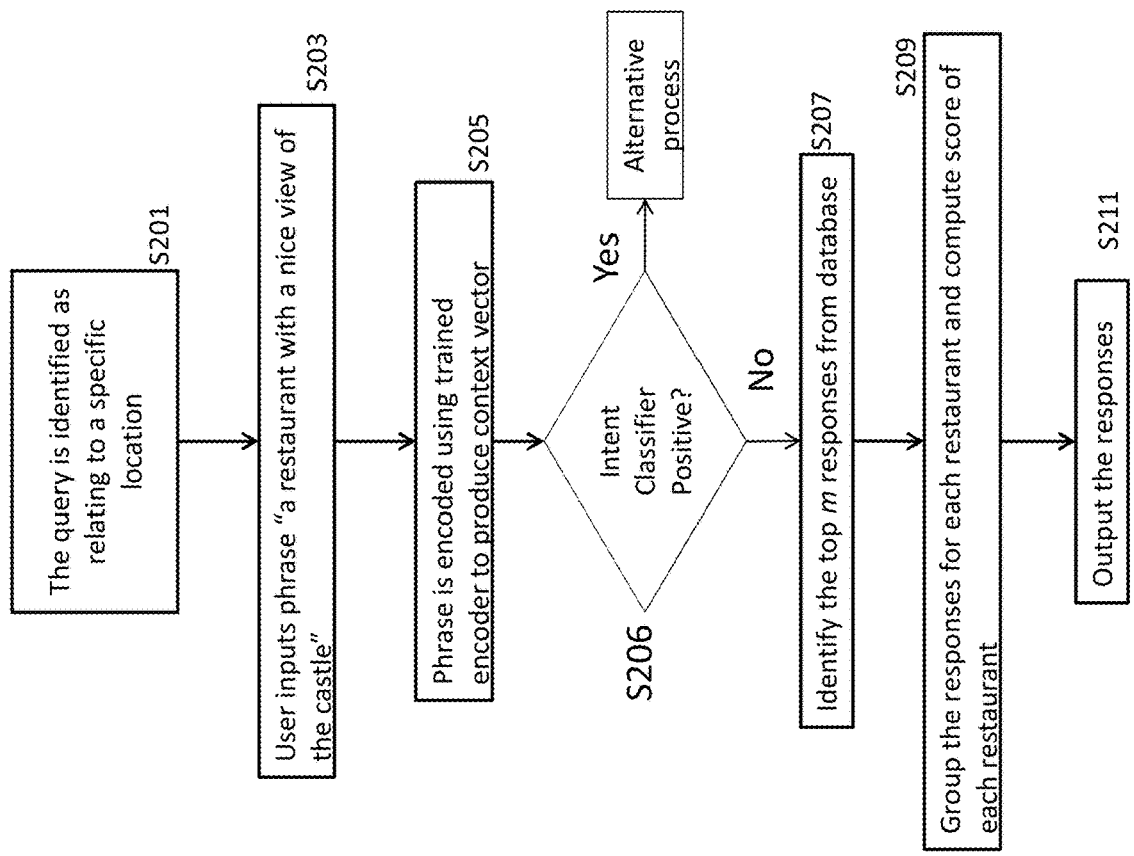

FIG. 4 (a) is a flowchart showing a method of obtaining a response to a query inputted by a user in accordance with an embodiment. The method shows steps that may be performed to generate the response shown in FIG. 3 (a) and (b) for example.

In this example, in step S401, the user enters the phrase "Is that place affordable?" In step S402 and S403, the phrase is encoded using a trained encoder 206 to produce a context vector $h_X$. An example method of training the encoder will be described with reference to FIGS. 7 to 10.

In an embodiment, the user speaks to provide the phrase. The system 100 in this case comprises a speech processing module (not shown) that converts the input speech to text. This text is then used in the next stage.

The encoder is trained to output a vector (a context vector $h_X$) for an input query. The training has been performed using queries and corresponding responses. The encoder 206 has been trained so that the encoder 206 for a query produces a context vector $h_X$ which is very similar to a response vector $h_Y$ for a suitable response. The similarity between the two vectors can be determined using a similarity measure such as the cosine similarity (which is obtained as $(h_X \cdot h_Y)/(|h_X||h_Y|)$).

The R possible response vectors $h_Y$ have been generated off-line and reside in a database. Therefore, once the phrase is encoded using the trained encoder and the $h_X$ context vector is produced, the next stage S404 is to look for a similar response vector for this context vector in the response vector database 209. In one embodiment, similarity is measured using cosine similarity. There are many possible ways in which the search space can be optimised to look for similar vectors however. In this example, the response vector with the highest similarity measure is selected for output.

The response may be output in a textual form in S405, as shown in FIG. 3 (a) or (b). In a further embodiment, the response is output as an audio signal, and a speech synthesis module is used to output at least one or more of the responses as synthesised speech.

The model targets response selection, which is framed as a response retrieval task. The model combines quantization with subword embeddings for compression of a ranking model for response selection, allowing storage and use of the model on devices with limited memory for example.

FIG. 4(b) shows a flow chart of a method of obtaining a response to a query inputted by a user in accordance with an alternative embodiment. The method described in relation to FIG. 4(a) lends itself to the one-shot task of finding the most relevant responses in a given context. However, in other applications, for example a dialogue system used for finding a restaurant, the system may need to support a dialogue flow where the user finds a restaurant, and then asks questions about it. The example relates to conversational search for restaurants, which is one of various applications for which the encoder can be used. A pre-trained model can be fine-tuned on various diverse domains such as search for restaurants or other applications however.

In this embodiment, the dialogue state is represented as the set of restaurants that are considered relevant. This starts off as all the restaurants in the given city, and is assumed to monotonically decrease in size as the conversation progresses, until the user converges to a single restaurant. A restaurant is only considered valid in the context of a new user input if it has relevant responses corresponding to it. Explicitly, the flow works as follows:

In step S201, the system determines that the user is interested in restaurants in a specific location. This could be due to the system tracking the user's location, the user inputting this information in response to a prompt or due to the user inputting this info in the absence of a prompt. A parameter S is initialised as the set of restaurants in the city.

In step S203, the user inputs "a restaurant with a nice view of the castle". In step S205, the input phrase is encoded in the same manner as has been described above.

In step S206, the encoded context vector produced in step S205 is put through an intent classifier that will be described below. If the intent classifier is negative then the process transfers to step S207.

In step S207, given the encoded users input, all the responses in the index pertaining to restaurants in S are retrieved and the top m responses, $r_1, r_2, \ldots, r_m$ are taken with corresponding cosine similarity scores: $s_1 \geq s_2 \geq \ldots \geq s_m$ Many methods can be used for a nearest neighbour search for determining the top m responses. In an embodiment, an approximate nearest neighbour search is performed where the responses are clustered and the similarity of the encoded context vector to the clusters is calculated. Such a search can be considered to be a form of greedy routing in k-Nearest Neighbor (k-NN) graphs. In an embodiment an algorithm similar to Hierarchical Navigable Small World, HNSW (https://arxiv.org/abs/1603.09320) is used. In a specific embodiment, HNSW is used where the graph index is hierarchical and searched through greedily.

In this example, there are multiple restaurants and the restaurants also need to be ranked. In an embodiment, this is performed by first computing probability scores $p_i \propto \exp(a\, s_i)$ with:

$$\sum_{i=1}^{N} p_i = 1$$

for a >0 constant hyper-parameter.

In step S209, the responses for each restaurant are grouped and a score $q_e$ for each restaurant $e \in S$ is determined $$q_e = \sum_{i: r_i \in e} p_i$$

Update S to the smallest set of restaurants with highest q whose q values sum up to more than a threshold t Next, in step S211 the most relevant responses for S are collated and the top 2 are selected. If there are multiple relevant restaurants, one response is shown from each. When only one restaurant is relevant, the top N responses are all shown.

A simple set of rules is used to provide a spoken response for the system (e.g. "One review of X said '_____'"). The rules employ templates to allow a natural answer to be provided. For example, if the user inputs a query that is likely to return responses relating to multiple restaurants, for example "Where is good for Indian food?"—a response will be provided with templates such as "Check out these places . . . ", "I found . . . ". However, when the responses relate to just one restaurant, the system might respond "According to . . . ", "Check out these results . . . "

As noted above, the number of restaurants is reduced as the dialogue progresses. When the user asks a first question, N top responses are identified and these correspond to S restaurants. When the user asks a follow-up question, the context vector of the new query is generated and this is compared with the response vectors for the already identified S restaurants. Once a new set of responses has been identified, only the restaurants (which are selected from the former group of restaurants) with the q value that sums to more than the threshold will be retained and so the number of restaurants is continually reduced until there is just one restaurant.

As noted above, in step S206, the encoded context vector is put through an intent classifier. One or more classifiers may be used. In an example, the system uses a set of intent classifiers, to allow resetting the dialogue state, and activating the table reservation flow.

In an embodiment, there are two dedicated classifiers applied in step S206 for discrete intent classification. For example, there are binary classifiers (i.e., the output of the classifier is 1 (intent detected) or 0 (no intent detected)) for two discrete intents:

1) restarting the conversation (i.e., restarting the search space and starting from scratch); and 2) transferring to the slot-based booking flow.

The two classifiers make use of the already-computed $h_X$ vectors that represent the user's latest text, and the actual classifier architecture can be, for example, a one-layer neural classifier with ReLu non-linear activation function and a 100-dimensional hidden layer.

In this example, a sigmoid function is used at the output layer and the training objective used is a (binary) cross-entropy loss function. The classifiers have to be trained on a set of positive and negative examples: the set of 100 positive examples for both intents (1. restart, 2. transition to booking) has been manually created (e.g., for the restart classifier positive examples are "Let's start again", "Restart", "Start over", "Let's do it again"), while a set of m (m=500 in an example) negative examples has been randomly sampled from the large pool of available responses. For transition to booking, the intent classifier can be trained on positive examples such as "I would like to book a table", "Do they have a table free?" etc.

If the intent classifier in step S206 is positive then an alternative process is used such as a slot based booking system or if the restart classifier is positive, then the system starts at the beginning and does not presume that a restaurant etc has been already selected.

FIG. 5 (a) is a schematic illustration of a first model 205 which may be used in a method in accordance with an embodiment. The first model 205 converts a user query 201 into a sequence of embeddings. Each arbitrary input text is first converted into a list of units, or tokens, which include subwords, and these are then represented by stored embeddings corresponding to the units. The parameters of the second model 207 are linked to this tokenization. The first model converts any input text into a list of units from the vocabulary V.

The first model 205 represents each unit of text with an embedding, which is a vector of length D. A unit of text corresponds to a sequence of one or more characters. A stored vocabulary comprises a set of units, and the corresponding embeddings. The vocabulary comprises units of text which are "subwords". A subword is an incomplete word. There may also be units corresponding to complete words in the vocabulary. For example, the word "certainly" may comprise the units "_certain" and "-ly". By complete or full words, it is meant that the words are valid English words (or valid words in the language used by the system). For example, the word "develops" can be segmented into _develop and -s (where _develop is a valid English word). Similarly, conversational can be segmented into _conversation and -al.

The set of units forming the vocabulary is determined during a pre-training stage, which will be described in further detail below. Complete words that are more frequent in the training data are more likely to be included in the vocabulary. Words such as it, includes, and words may all exist in the vocabulary V, so they are not actually segmented by the tokenisation model during use, i.e. these are tokenized as _it, _includes, and _words. Rare and out-of-vocabulary words such as mockumentary and flexitarian will be segmented into smaller subword units during use for example.

The set of units form a vocabulary, comprising V units. The units (i.e. the string of characters forming the unit) and the corresponding embeddings (the numerical vector of length D) are stored in the storage 107, for example in a look-up table. The vocabulary of units, i.e. the set of units, is learned from data during the pre-training stage, and the embeddings corresponding to each unit are also learned during the training stage. An input unit query is converted to a sequence of stored units. The units are then replaced with the stored embeddings corresponding to the units.

Using a vocabulary including subword units means that a smaller vocabulary size can be used compared to a word level vocabulary for example. For example, a word level vocabulary may require ~1M words in order to capture a language, whereas a vocabulary including subword level units may capture the same number of words using ~40K units, which represents around a ×25 reduction in V. In an embodiment, the vocabulary comprises 30,000-50,000 units, at least some of which are subword units.

Subword-level tokenization also allows for a simple and straightforward processing of out-of-vocabulary (OOV) words, i.e. words that have not been seen during training. The OOV words are broken down into units which exist in the vocabulary V. For example, the vocabulary may comprise the word "certain", but when the first model 205 encounters the word "certainly", it is able to break it down into the subwords "_certain" and "-ly".

Although the example described here relates to English language, subword tokenisation works well for many languages, and the same methods can be applied to systems based on other languages.

FIG. 5 (a) is a schematic illustration of a first model 205 which may be used in a method in accordance with an embodiment. The first model 205 uses a stored vocabulary 509 of size V. The first model 205 comprises a tokenisation algorithm 501 that is configured to segment an input text string into a sequence of units, where each unit is contained in the vocabulary 509. The vocabulary 509 comprises a database having V units and their corresponding embeddings, as well as K additional embeddings which will be described below. In an embodiment, V is 32,000.

Prior to using the first model 205 to segment an input text string into a sequence of units, either for inference or training, a vocabulary 509 comprising V units is learned. How the vocabulary 509 is learnt is described further below.

To apply the first model 205 to input text from the user, an algorithm performing parameter-less matching of sequences of characters from the input text, starting from the beginning of the word, to the units in the vocabulary V is used, referred to here as a tokenisation algorithm 501. The tokenisation algorithm 501 is not a training algorithm and does not use learned parameters. The learned parameters of the first model 205 are the elements of the embeddings. A greedy pattern matching approach may be used, an example of which is explained below. With the greedy pattern matching, there is no need to store further model parameters for the tokenisation algorithm 501, only a vocabulary 509 is stored. The tokenisation algorithm 501 can be used on any stored vocabulary, i.e. if the vocabulary 509 is changed, the same tokenisation algorithm 501 can be used.

An example of a tokenisation algorithm is the tensor2tensor SubwordTextEncoder module described in Vaswani, Ashish, et al. "Tensor2tensor for neural machine translation." arXiv preprint arXiv:1803.07416 (2018), the contents of which are incorporated herein by reference. An example of such an algorithm is given at https://github.com/tensorflow/tensor2tensor/blob/df4a50be8db63d36bb-2391e1adc04558c0e8e1c9/tensor2tensor/data_generators/text_encoder.py#L400, the contents of which are incorporated herein by reference.

Figure 5A:
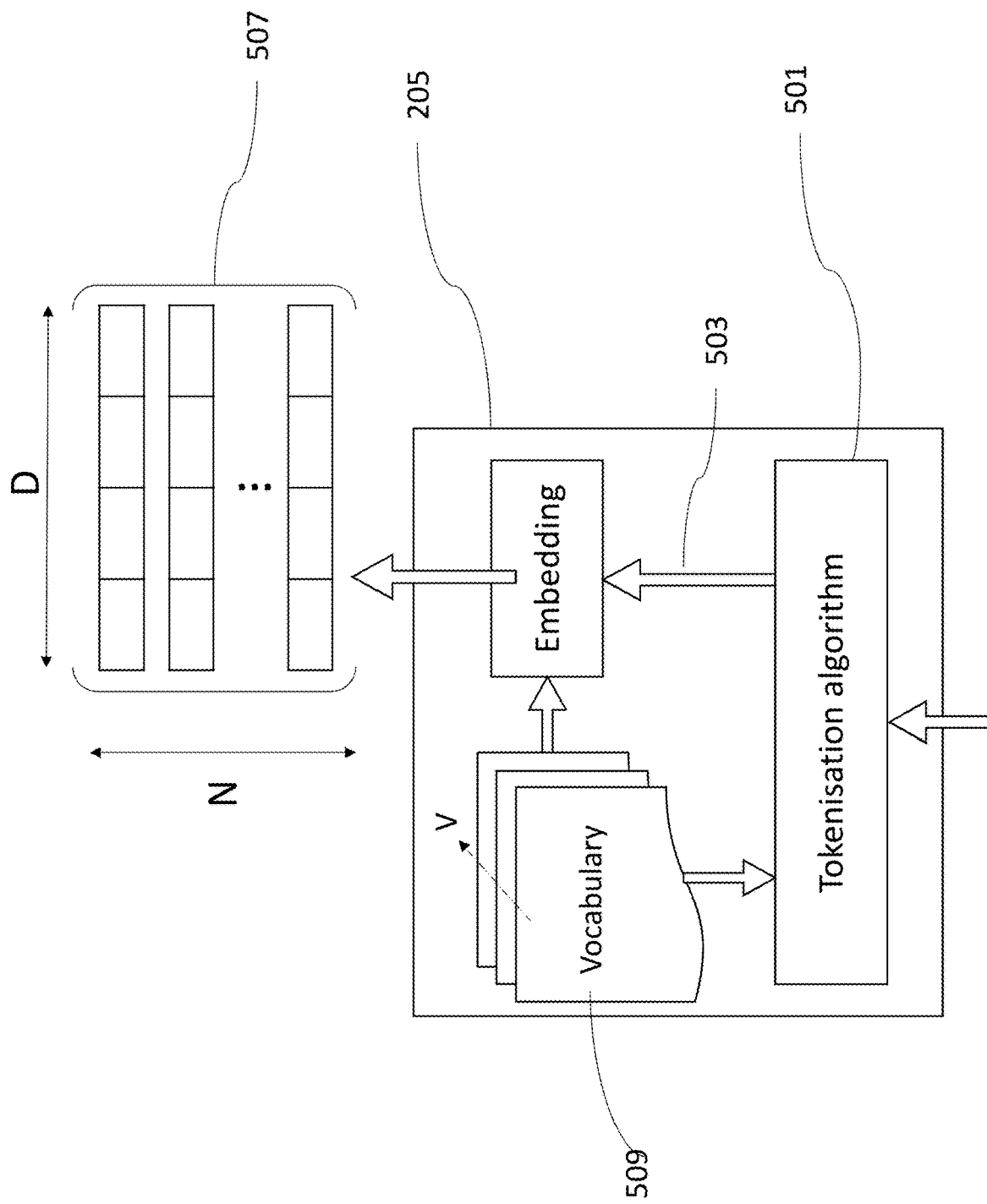
FIG. 5 (a) is schematic illustration of an example of a first model which is used in a dialogue system in accordance with an embodiment.
Figure 5B:
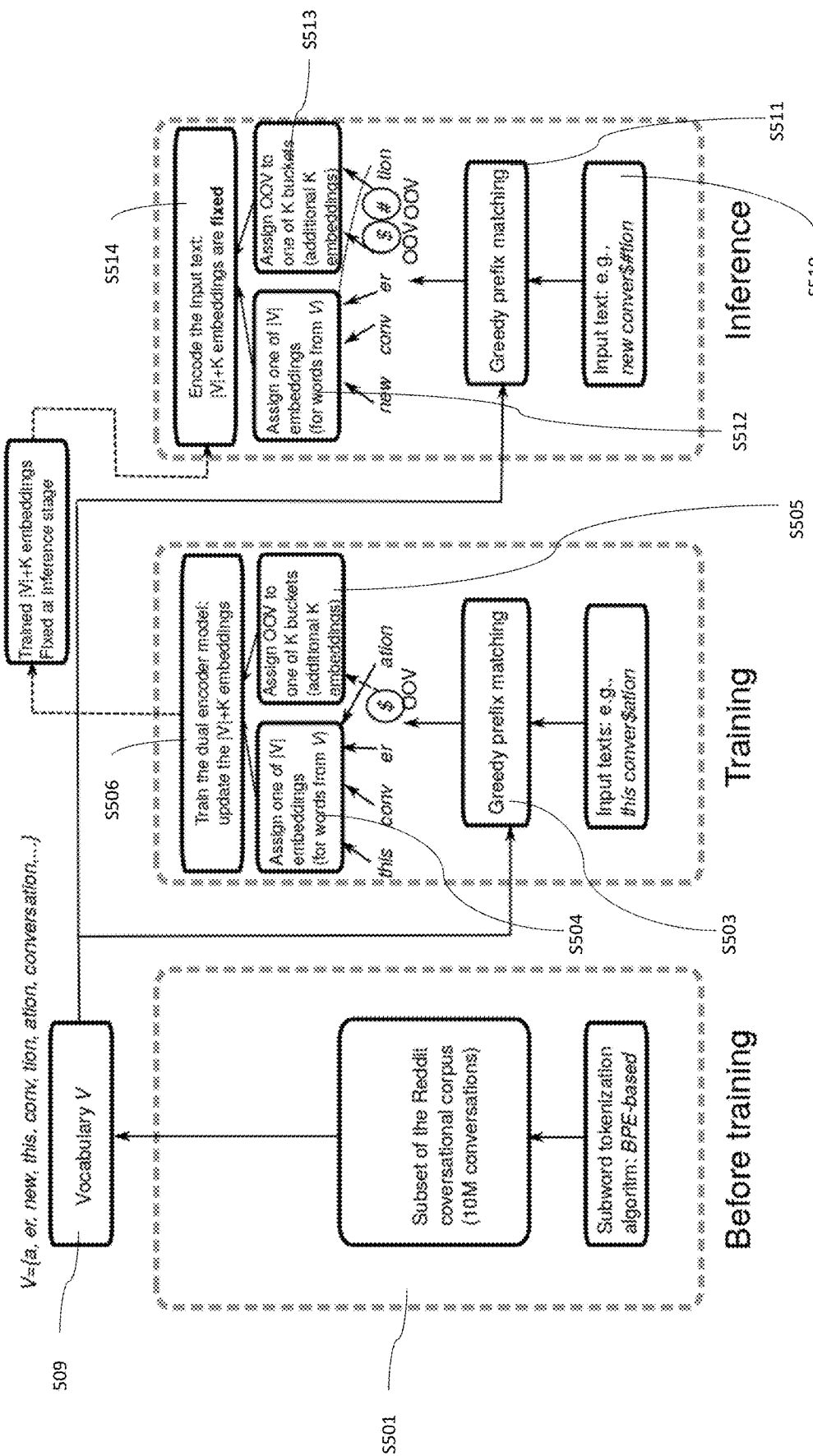

FIG. 5(b) shows a flowchart illustrating the operation of the first model 205. In particular, the part labelled "Inference" shows the operation of the first model 205. The "Before training" and "Training" parts of the figure will be described later. As has been described above, a vocabulary of V units is generated in the pre-training stage, each unit corresponding to a stored embedding which is learned during training. An additional K stored embeddings are also learned during the training stage. OOV characters encountered during the tokenisation step are assigned one of the K embeddings, as will be described below. For each word, the tokenisation algorithm always picks the longest unit that matches the beginning of the given word, and this is repeated, always picking the longest unit from the vocabulary that matches the beginning of what is still available of the given word. If no units from the vocabulary match, the first character of the word is assigned to one of the K embeddings, and the method continues, matching the beginning of what remains of the word to a unit from the vocabulary as before. The beginning of the word is also described as a prefix.

In the example shown, an input text "new conver$#tion" is provided as input during step S510. This is divided into words, "new" and "conver$#tion". The vocabulary V in this example comprises the relevant units "a", "c", "con" "er", "this", "new", "conv", "tion", "ation", "conversation", as well as other units. In step S511, the words "new" and "conver$#tion" are tokenised using greedy prefix matching. The units in the vocabulary are compared to the characters starting from the beginning of the word, and starting from the longest units. Thus for the word "conver$#tion", the unit "ation" will be compared with the first five characters of the word first, and determined not to match, then the unit "conv" will be compared with the first four characters of the word and be determined to match. The next comparison will be taken with the remaining word, "er$#tion", and the unit "er" will be determined as the longest unit that matches. The next comparison will be taken with the remaining word "$#tion". In this case, the first character $ does not exist in any of the units in the vocabulary, thus none of the units will match. The first character is therefore "escaped", and assigned one of the K embeddings reserved for out of vocabulary characters. This process is continued until the end of the word.

By "prefix" it is meant 'preceding sequences of characters'. During the greedy matching, it is started from the beginning of the word. For each word it always picks the longest subword that matches the prefix (i.e., the beginning) of what is still available (non-segmented) of the given word.

After the subword tokenisation step S511, the units that are present in the vocabulary, e.g. "new", "conv", "er" and "ion" are each replaced with their respective embeddings in step S512. OOV characters such as "$" and "#" are assigned one of the K additional embeddings in step S513. In step S514, the embedded representation of the input text is output.

The tokenisation algorithm 501 shown in FIG. 5(b) is configured to perform the following steps:

Initial word-level tokenization: divide the entire text into a set of "words", where a "word" is a unicode string of either all alphanumeric or all non-alphanumeric characters. Two "words" are assumed to be divided by a single space (or more spaces). All spaces that are between two alphanumeric "words" are then removed.

Subword-level tokenization of "words", including escaping OOV characters: The selection of units is done in a greedy fashion from beginning to end. Each unit from the vocabulary is considered in turn. For each unit from the vocabulary that is a subunit of a word, the unit is returned, with an underscore "_" appended to its end. The list is extracted in order, choosing the longest unit in the vocabulary V that matches a prefix of the remaining portion of the encoded "word". In this step, all underscore and OOV characters which are not included in any of the units of the vocabulary are escaped. Each "unit" is formatted to begin with an underscore, or may be formatted to end with an underscore.

Final concatenation: All units are concatenated in a list. The concatenation operation is invertible because the trailing underscores signal the initial "word"-level tokenization.

FIG. 5(c) shows examples of tokenisation of input text performed by the tokenisation algorithm 501. An input string 501 such as "PolyAI develops a machine learning platform for conversational artificial intelligence." is segmented into sequence of units 503, for example: "_poly -ai _develop -s _a _machine _learning _platform _ for _conversation—aI _artificial _intelligence _." In this example, each word begins with an underscore.

Where a word comprises two or more units, each unit is preceded with a hyphen. Other examples of segmentation are also shown in FIG. 5(c). A list of all units from the input query is constructed. Each item from the list of concatenated units will then be assigned an embedding.

Each unit in the sequence is then replaced by its embedding. Each unit from the vocabulary V is associated with a D-dimensional embedding representation, and each additional OOV "unit" is assigned one of K additional D-dimensional stored embedding representations. Each unit in the sequence is used to retrieve the corresponding embedding from the database. Thus, when a sequence has N units, then a sequence of N embeddings is output. In the example shown in FIG. 5 (a), the output 507 of the first model 207 is a N×D matrix, where each of the N rows represents one of the units in the sequence.

The sequence of embeddings is then provided as input to the second model 207. These embeddings are stored parameters of the first model 205. These parameters are learned in the training phase and are then used directly, relying on a learned lookup table.

As has been described above, the set of |V|+K embeddings is stored, where each element of each embedding is stored using an 8 bit representation. The 8 bits are used to define 256 equally spaced values from a min value to a max value. Each of the integer numbers from 0 to 255 may be represented by the 8 bit format. Each integer number from 0 to 255 maps to one of the float 32 format values from the min to max value. The first model outputs a sequence of embeddings, where each element of each embedding is an 8 bit representation of a number from 0 to 255. A step of converting this number to the corresponding float 32 format value (from the min value to the max value) is then performed, before inputting the higher precision version embeddings into the second model 207. The conversion may be performed in various ways. For example, a look-up table may be stored, in which each value from 0 to 255 is mapped to the corresponding value in float 32 format (from min to max). Alternatively, a function which performs re-centering and scaling of the integer number n between 0 and 255 to the corresponding float 32 format value from min to max is used. The function min+{n(max−min)/256} may be used to convert n to the embedding value for example.

Figure 6A:
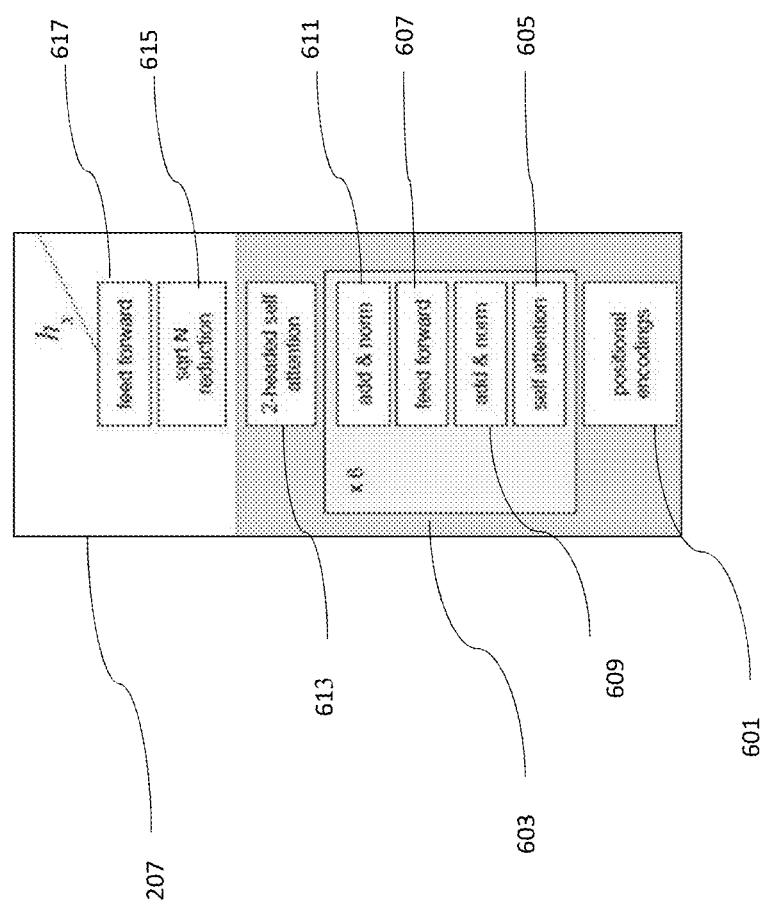
FIG. 6 (a) is a schematic illustration of an example of a second model which is used in a dialogue system in accordance with an embodiment.
Figure 6B:
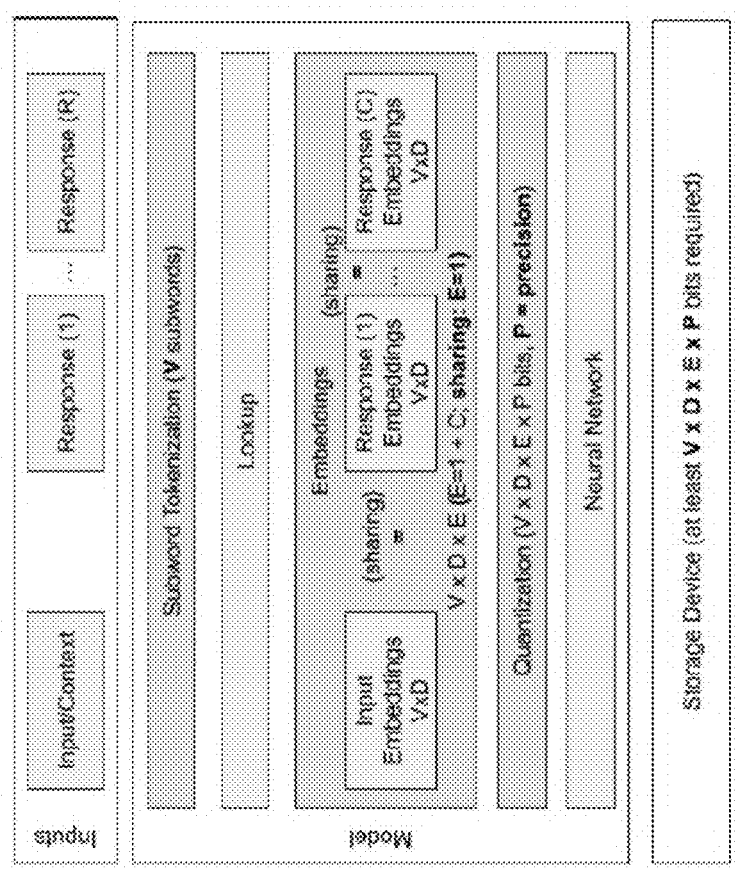

FIG. 6 (a) is a schematic illustration of a second model 207 which is used in a method in accordance with an embodiment. Although an example architecture is shown, various neural network architectures may be used to encode the input queries, for example recurrent (e.g. LSTM or bidirectional LSTM) or convolutional neural networks can be used, or an even a simple neural network. In the example illustrated in FIG. 6 (a), a neural network architecture based on a "Transformer Network" is used.

A transformer network is a sequence to sequence network that does not comprise any recurrent networks. The transformer network comprises an encoder part and a decoder part during training. The encoder part is used during inference, and is shown in FIG. 6(a). The encoder part and decoder part comprise two or more repeating modules, or blocks. Each module comprises at least one attention layer. The transformer comprises one or more attention mechanisms which are sequence-to-sequence information that dispense of stepwise sequential nature.

The second model 207 comprises a "positional encodings" step 601. The input to this step comprises the sequence of embeddings output from the first model 205, which is a list of vectors each having length D, where each element of each vector has been converted into float 32 format as described above. The parameters of the second model, for example the weights, may be stored in float 16 format. The operations performed may be performed in float 32 format, so that the output of each layer, and input into each subsequent layer, comprises elements which are stored as float 32 format. The elements of the context vector output from the second model 207 are float 32 format.

In an example, the length of the sequence of embeddings output from the first model 205 fed into the second model 207 is truncated to 60 units. Referring to the output 507 in FIG. 5 (a), N=60 in this example. In case the output 507 is shorter than N=60, the sequence is padded accordingly so that all the sequences are of the same length. Padding masking is applied to mitigate any effect of the padding on further computations. Various methods of masking out the padding are known and may be used. Masking may be implemented by including indicator variables which denote which parts of the sequence have been padded and which come from the original sequence in a mask tensor. A TensorFlow sequence_mask function may be used for this purpose.

In step 601, the subword embeddings sequence is augmented with positional encodings. The positional encodings are in the form of vectors of length D, with one positional encoding vector corresponding to each embedding in the input sequence. The positional encoding vector is summed with the corresponding embedding in the sequence. The positional encodings step 601 thus outputs a sequence of vectors, where the sequence is the same length as the input sequence of embeddings, and each of the vectors output from the positional encodings stage 601 also has length D.

Various methods of generating the positional encoding vectors may be used, for example the positional encodings may be learned as parameters of the second model, or fixed (for example each element may be some function of the position of the unit in the sequence). Adding the positional encodings captures information about the position of the unit in the sequence. According to an example, the positional encoding is formed by the functions $PE_{(pos,2i)}=\sin(pos/10000^{2i/D})$ and $PE_{(pos,2i+1)}=\cos(pos/10000^{2i/D})$, where pos is the position and i is the dimension. According to another example, a vector at position pos in the sequence is added to $X_{(pos\ mod\ 11)}$ and to $Y_{(pos\ mod\ 47)}$, where mod is the modulo operator and where X is a bank of encodings with 11 vectors and Y is a bank of encodings with 47 vectors. In the latter example, up to 47×11 positions can be generalised by the network.

The sequence of vectors output from the positional encodings step 601 is then fed into a first block of a set of M repeating blocks 603. In the example shown in FIG. 6, M=6. For simplicity, a single block 603 is shown in the figure, with the repetition indicated by "×6". The output sequence of each block 603 is fed as an input to the next block 603. The output of the final block 603 is a sequence of vectors, in this case the sequence having the same length as the sequence output from the first model 205. In an embodiment, each block 603 receives a sequence of vectors each of length D, and outputs a sequence of vectors, each of length D.

Each block 603 comprises a self-attention layer 605, a layer-normalization step 609, a feedforward neural network 607 and a further layer-normalization step 611. In the embodiment described below, the self-attention layer 605 uses single head attention. Self-attention layers having multi heads could also be used, however it was empirically determined that a self-attention layer having a single head was quicker to train and the performance was did not differ significantly from multi headed attention.

The self-attention layer 605 comprises three stored matrices of weights, where the weights are trainable parameters of the second model 207. The matrices may be referred to as the "query weight matrix" $W_Q$, the "key weight matrix" $W_K$ and the "value weight matrix" $W_V$. Each matrix has a number of rows equal to the embedding length D. The number of columns may be selected as a hyperparameter. In an embodiment, each matrix has dimension D×D. In another example, when D=512, each matrix has dimension 512×64. The sequence of embeddings input to the block is combined to form an input matrix, where each embedding forms a row of the input matrix. The input matrix X has a number of rows equal to the number of embeddings in the input sequence, N, and a number of columns equal to D. The matrix product of the input matrix with each of the weight matrices is taken, resulting in three output matrices, the query matrix Q, the key matrix K and the value matrix V (where $Q=XW_Q$, $K=XW_K$ and $V=XW_V$). Each of the query matrix, key matrix and the value matrix has a number of rows equal to the number of embeddings in the input sequence, and a number of columns equal to the number of columns of the weight matrices, which in an embodiment may be set to D.

The output of the self attention layer is then calculated. The output is a matrix O, which is calculated by the following matrix calculation:

$$O = softmax\left\{\frac{QK^T}{c}\right\}V$$

where c is a constant. In an embodiment, c is equal to the square root of the number of columns of the key weight matrix. In an example, when each matrix $W_Q$, $W_K$ or $W_V$ has dimension 512×64, $c=\sqrt{64}$. The softmax operation normalizes the values. The output matrix O has the same number of rows as the input matrix, N, and the number of columns is equal to the number of columns of the weight matrices. In an embodiment, the output matrix also has the same number of columns as the input matrix, D. Thus O is an N×D matrix. The self-attention layer 605 allows the model to incorporate a representation of other units in the sequence into the encoding of the current unit.

In an embodiment, the above M blocks 603 have a kernel dimensionality of 2048, a projection dimension of 64, and an embedding dimension of D=512 at the input and output.

In an alternative example, while there are M repeating blocks 603, the self attention layer 605 of each block is constrained to attend to different numbers of positions for each token. In an example with M=6, one block is constrained to attending over positions ±3 for each token, another block is constrained to attend to positions ±5 for each token, and the four remaining blocks are constrained to attending over positions ±48 for each token to help the model generalise to long sequences. This involves having growing values [3, 5, 48, 48, 48, 48] of maximum relative attention as it is progressed through the blocks. This helps the architecture to generalize to long sequences and distant dependencies, guiding training so that earlier layers are forced to group together meanings at the phrase level before later layers model larger patterns. This is implemented by using weight matrices of different dimensionality according to the layer-specific value, i.e. by selecting the number of columns.

The output matrix O is input to the layer-normalization step 609, in which it is summed with the input matrix X, and a layer-norm operation applied to the resulting matrix. Each row of the resulting matrix is then fed into the feed forward neural network sequentially.

The feed forward neural network 607 is a fully-connected feed-forward network (FFN) which is applied to each input vector separately and identically. In an embodiment, the FFN comprises two linear transformations with a ReLU activation in between. In an embodiment, the dimensionality of the input and output of these FFNs is D. In a further embodiment, the dimensionality of the hidden layers in each FFN is set also to D.

A further layer-normalisation step 611 is then performed to the output of the feed forward neural network 607, and the sequence of vectors is taken as input to the next block 603.

The output of the final block 603 is taken as input to a two headed self-attention layer 613. The two self attention heads each compute weights for a weighted sum, which is scaled by the square root of the sequence length in the square-root-of-N reduction layer 615. The use of two headed attention improves the model's ability to focus on different positions compared to single headed attention, whilst still being relatively quick and efficient to train, and using less parameters to obtain similar results than an 8-headed attention for example. The two-headed self attention layer 613 has a projection dimension of 64 and a concatenated embedding dimension of 2D=1024. Including the two headed self attention layer 613 increases the ability to incorporate a representation of other units in the sequence into the encoding of the current unit. The use of two headed self-attention improves the model's ability to focus on different positions and to capture the relationships between a subword and another based on its position in the sequence. Two query weight matrices, two key weight matrices and two value weight matrices are used, each being randomly initialized and learned during training. Two representation subspaces are thus included.

In this layer, the output sequence of vectors from the final block 603 is combined to form an input matrix, where each vector forms a row of the input matrix. The input matrix is taken separately into two separate self attention layers which operate in the same manner as has been described above, but with independent weight matrices. The weight matrices may also be D×D matrices. Two output matrices are generated, each being an N×D matrix, which are concatenated to form an N×2D matrix. The weight matrices are also trainable parameters of the model. The two headed self-attention has a projection dimension of 64. In alternative embodiments, more than two self attention heads, e.g. 8 self attention heads, are used. In yet another embodiment, a single self attention head is used.

The output matrix is then reduced with square-root-of-N reduction 615 to convert the sequence to a single fixed-dimensional vector. In the embodiment above with two headed self attention 613, the output has an dimensions of N×2D, where D=512. The N values for each column of the output matrix are summed, and then each resulting value is divided by the square root of N, resulting in an output vector of 2D values. This reduction step normalizes the representation of the sequence into a L2-normalised vector of fixed dimensionality 2D, where the dimensionality is 2*512=1024 in an example, after concatenation of the representations from the final 2-headed self-attention. The output is divided by the square root of the sequence length N. The attention weight $a_{ij}$ is computed for each pair of subwords such that $\Sigma_j a_{ij}=1$. The reduced output is then $\Sigma_j (\Sigma_i a_{ij} w_j)/\sqrt{N}$.

The reduced output of dimension 2D is taken as input to the final feed forward layer 617, which outputs the context vector $h_x$, having length D. The reduced representation is passed through a series of H fully connected n-dimensional feed-forward hidden layers with GELU as the non-linear activation, defined as: GELU(x)=x·sigmoid(1.702*x). In an example, H=3, and n=1, 024. The final layer feed forward layer 617 is linear and maps the text into the final D-dimensional (D=512) representation $h_x$ for the input text.

The second model 207 is a subword-based model, in other words it takes as input representations of units (including subwords) of the input text. The second model 207 is trained to build sequential representations.

A method of training a response retrieval system to provide a response to a query inputted by a user in accordance with an embodiment will now be described.

Prior to training the first model 205 and the second model 207, the vocabulary of units used by the tokenisation algorithm 501 of the first model 205 is first learned in a pre-training stage. FIG. 5(b) shows a flowchart illustrating the steps performed to learn the vocabulary of units, in the stage labelled "Before Training". The vocabulary is sometimes referred to as a "subword vocabulary", although, as has been explained previously, the vocabulary may also comprise complete words. This is done using a subset of the training data, which comprises inputs and responses. An alternative training data set may be used to learn the vocabulary 509 of the first model 205, however in this example a subset of the same training data used to train the rest of the model (i.e. inputs and responses) is used. In the example shown, this is a subset of a Reddit conversational corpus comprising 10M conversation.

Step S501 comprises a subword tokenisation algorithm that splits arbitrary input into subword units. The subword units into which the arbitrary input is split into is what is learned in S501. A number of subword tokenization methods are available for learning a vocabulary of units including subwords, including: supervised subword tokenization using a pretrained segmenter/tokenizer such as the Chipmunk model (for example as described in Cotterell, Ryan, et al. "Labeled morphological segmentation with semi-Markov models." Proceedings of the Nineteenth Conference on Computational Natural Language Learning. 2015), tokenization based on Byte-Pair Encodings (for example, as described in Philip Gage. 1994. A new algorithm for data compression. C Users J. 12, 2 (February 1994), 23-38; Heinzerling, Benjamin, and Michael Strube. "Bpemb: Tokenization-free pre-trained subword embeddings in 275 languages." arXiv preprint arXiv:1710.02187 (2017)), character n-grams (for example, as described in Wieting, John, et al. "Charagram: Embedding words and sentences via character n-grams." arXiv preprint arXiv:1607.02789 (2016); Bojanowski, Piotr, et al. "Enriching word vectors with subword information." Transactions of the Association for Computational Linguistics 5 (2017): 135-146), tokenization based on the Morfessor tool (for example, as described in Smit, Peter, et al. "Morfessor 2.0: Toolkit for statistical morphological segmentation." Proceedings of the Demonstrations at the 14th Conference of the European Chapter of the Association for Computational Linguistics. 2014), and WordPiece (for example, as described in Schuster, Mike, and Kaisuke Nakajima. "Japanese and korean voice search." 2012 IEEE International Conference on Acoustics, Speech and Signal Processing (ICASSP). IEEE, 2012) or a neural variant of this model such as is used in several natural language processing representation architectures such as BERT (for example, as described in Devlin, Jacob, et al. "Bert: Pre-training of deep bidirectional transformers for language understanding." arXiv preprint arXiv: 1810.04805 (2018)).

A sub-word vocabulary can be learned from the training data set using the following steps, based on a byte-pair encoding method for example:

- Initial word-level tokenization, as has been described above in relation to FIG. 5(a), is performed for all queries and responses in the subset of training data. In this step, the text is divided into a set of "words", each comprising a string of characters.
- The subword vocabulary size is set, for example V=32, 000. This is a hyper-parameter which may be varied to improve performance.

Each word is represented as a sequence of characters. The word frequency is appended to each word, i.e. how many times the word appears in the subset of the training data.

A subword is generated by merging pairs of characters, and selecting the subword as being the pair having the highest frequency occurrence in the subset of training data. This subword then replaces the pair of characters throughout the training data set, and is treated as a new "character" in the subsequent steps.

The previous step is repeated (with the previously generated subwords being treated as "characters") until the selected subword vocabulary size is reached.

In an alternative embodiment, a subword vocabulary may be learned from the data using the SentencePiece model. SentencePiece is an open-source subword tokenizer tool. A description of SentencePiece is given in Kudo, Taku, and John Richardson. "Sentencepiece: A simple and language independent subword tokenizer and detokenizer for neural text processing." arXiv preprint arXiv:1808.06226 (2018)., the contents of which are incorporated herein by reference. The SentencePiece tool is available at https://github.com/google/sentencepiece. In a further embodiment, a variant of the SentencePiece tool which is based on the unigram language model (ULM) is used, as described in Kudo "Subword regularization: Improving neural network translation models with multiple subword candidates." arXiv preprint arXiv:1804.10959 (2018), the contents of which are incorporated by reference herein.

In an example, learning a sub-word vocabulary from the training data set using the SentencePiece tokenizer tool comprises the following steps:

The text is divided into a set of "words", each comprising a string of characters.

The subword vocabulary size is set, for example 32, 000. This is a hyper-parameter which may be varied to improve performance.

The probability of word occurrence is optimised by giving a word sequence

The loss of each sub-word is computed.

The sub-words are sorted according to their respective loss, and the top X % of the sub-words with low loss are kept (e.g. X=80%).

The last three steps are repeated until a subword vocabulary size equal to the defined amount (e.g. 32,000) is reached.

In an embodiment, a SentencePiece based subword tokenization algorithm is used to learn a vocabulary using a data set extracted from Reddit. A subword vocabulary of |V|=32k units is learned over a randomly sampled Reddit subset of 10M input and response examples. As for the Byte Pair Encoding based method described above, the size of the vocabulary V is pre-defined. For English, a vocabulary size in the range of 30k-50k may be used. However, V is a tunable hyper-parameter of the model. The size of the Reddit subset used to learn the subword vocabulary is also a model hyper-parameter, but it has been empirically determined that taking subsets larger than 10M did not yield much difference in the subword vocabulary, while the cost of vocabulary extraction is larger with larger subsets. Although the above example relates to a vocabulary of subwords for the English language, a vocabulary for a different language can be learned in a corresponding manner.

Once the vocabulary 509 of the first model 205 has been learned in S501, the first model 205 can be used to segment an input text into a list of subwords. The segmentation of an input text into a list of subwords is performed using the tokenisation algorithm in the same manner as has been explained in relation to FIG. 5(a) and in relation to the "Inference" stage of FIG. 5(b) above. The difference in the "Training" stage is that the embeddings assigned to each unit are optimised in the subsequent steps. The tokenisation algorithm 501 can be applied on any input text, including input queries and responses. The process of learning the vocabulary V is detached from the actual segmentation of the input text into units during training and inference. For learning the vocabulary, the variant of the SentencePiece algorithm which is based on the unigram language model may be pre-trained once on the 10M Reddit subset, with |V| set to 32000.

A segmentation algorithm such as the SentencePiece algorithm is used to get the vocabulary V. This algorithm is not used in the following stages for segmentation of input text into units. Rather, a 'hybrid' approach is used, where the segmentation algorithm is used to learn the vocabulary, and a greedy tokensiation algorithm, which is quicker and does not require storing parameters of another model on the device is used to segment the input text, by matching parts of the input text to the stored units. A segmentation model is used as a pre-training step of obtaining the vocabulary V. By not relying on a specific model for segmenting the input text, that is, by relying on much simpler greedy matching, a different vocabulary may be used without having to re-train the tokenisation algorithm. The simple matching tokenisation algorithm works with any vocabulary V and does not require a standalone segmentation method if the vocabulary V is known.

In the "Before training" stage, a stored vocabulary 509 of V units is generated. In the "Training" stage, the first model 205 is trained together with the second model 207. This means that the values of the embeddings used by the first model 205 and the parameters of the second model 207 are optimised. An input text is provided in S502. In this example, the input text is "new conver$ation". The input text is tokenised in S503 using the greedy matching approach as described in relation to FIG. 5(a) and the "Inference" stage of FIG. 5(b) above. In step S504, units that are present in the vocabulary 509 are assigned their respective embeddings, so in this example, units such as "this", "conv", "er", "ation" are assigned their respective embeddings. OOV characters such as "$" is assigned to one of K additional embeddings in step S505. K is a hyperparameter, and may be selected. In an embodiment, K=1000.

Each unit in the vocabulary V is stored with a corresponding embedding, which is a vector of length D. K additional embeddings are also stored. The embeddings are randomly initialised.

In step S506, a sequence of N embeddings, in the form of N×D matrix 507 (described above in relation to FIG. 5(a)) is outputted and fed into the second model 207. During training of the response selection model, as described in relation to FIGS. 7 and 8, the embeddings are updated and learned as parameters of the model. The embeddings are thus considered trainable parameters of the first model 205. The embeddings are learned starting from random initialisations. When training the response selection dual encoder 701, each unit from the vocabulary V gets assigned a dedicated embedding, and an additional K embeddings are included. These are then optimised during the model training.

In an embodiment, the second model is configured to receive a sequence of N=60 units. In selecting data from the training set, sentences with >128 characters are excluded. Therefore, in most cases, the sequence has a length of less than 60 units. When the output 507 is shorter than N=60, the sequence is padded accordingly so that all the sequences are of the same length. Padding comprises, for example, zero padding. In addition, padding masking is applied to mitigate any influence of the zero padded values on subsequent computations. In case the length is greater than 60 units, then the sequence is truncated. Truncation is carried out such that no subwords are split. The training data is thus limited to sentences with a maximum of 128 characters. This increases training speed, as modelling longer sequences does not contribute much to the overall model quality, while it slows down training.

Figure 7:
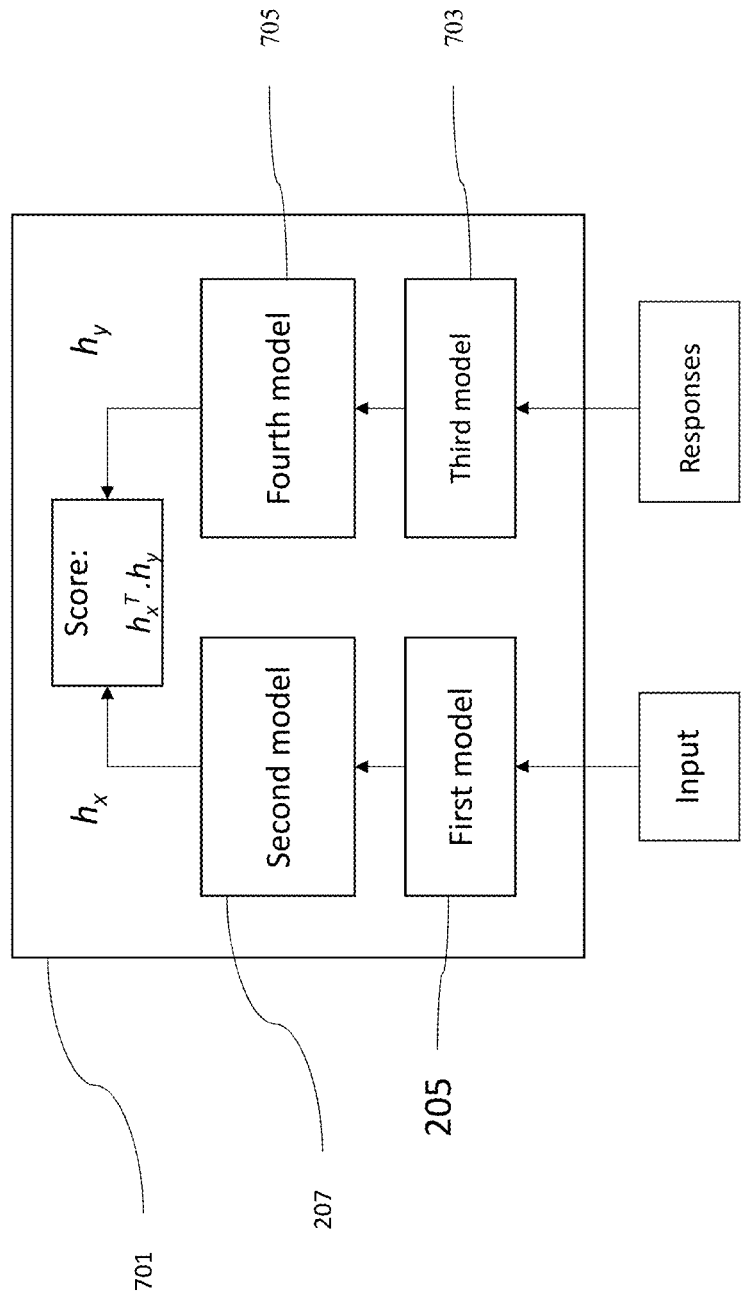
FIG. 7 is a schematic illustration of a dual encoder model used in a method of training a response retrieval system in accordance with an embodiment.

The first model 205 and second model 207 are jointly trained as part of a dual encoder model. A dual encoder model 701 which is used in a method of training in accordance with an embodiment is shown in FIG. 7. The dual encoder model comprises the first model 205, which comprises the tokenisation algorithm 501 and the stored vocabulary 509 comprising the units (strings of characters) and the corresponding initial embeddings, as well as the K additional embeddings, as has been described in relation to FIG. 5(a). The embeddings are optimised during the training process. The dual encoder 701 further comprises the second model 207, as described in relation to FIG. 6(a). The parameters of the second model 207, including the weights of the neural networks and self-attention layers, are also optimised during training.

Figure 8:
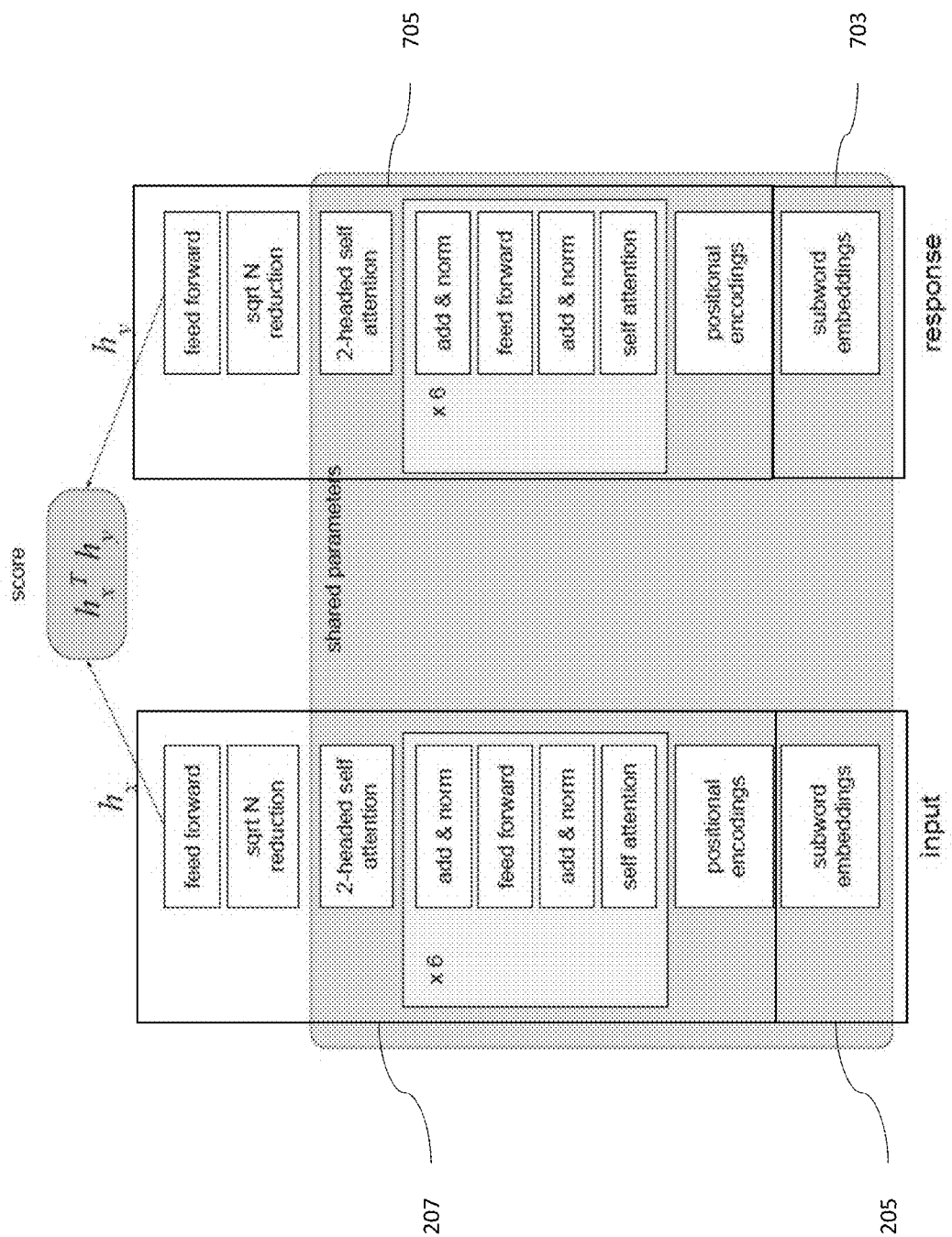
FIG. 8 is a schematic illustration of a dual encoder model used in a method of training a response retrieval system in accordance with an embodiment.

FIG. 8 shows a schematic illustration of the dual encoder system comprising the second model 207. The dual encoder further 701 comprises a third model 703. The third model 703 comprises the tokenisation algorithm 501, and uses the same stored vocabulary 509 and embeddings as the first model 205. The vocabulary 509 and the embeddings may be stored in the storage 107 and accessed by both the first model 205 and the third model 703. The third model 703 and the first model 205 thus share the embeddings, i.e. trainable parameters. The dual encoder further 701 comprises a fourth model 705. The fourth model 705 is similar to the second model 207. The parameters of the fourth model 705, including the weights of the neural networks and self-attention layers, are also optimised during training. Some of these parameters may be shared with the second model 207.

An input query and an input response are segmented into units from the vocabulary during training in the same manner as the inputs are converted into units as described in relation to FIG. 5(a) above. The same deep transformer network is used on both sides of the dual encoder model i.e., to encode both inputs and responses starting from their subword-level tokenization.

Figure 10:
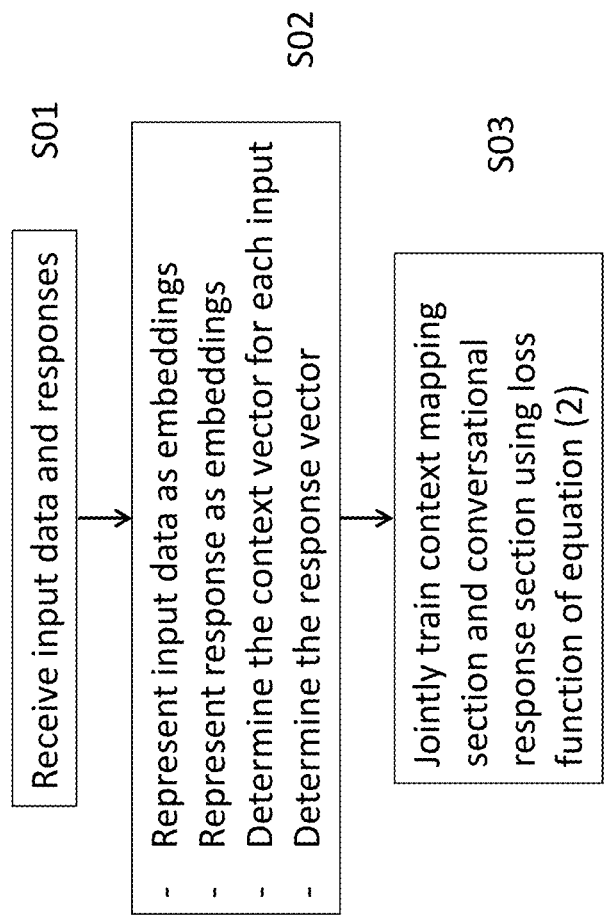
FIG. 10 is a schematic illustration of a method of training a dual encoder model in accordance with an embodiment.

FIG. 10 is a flow diagram showing the training of a system. In the training method shown, the first model 205 uses a stored vocabulary 509 with V units. The V units of the stored vocabulary 509 are predetermined as they have been learned in step S501 of FIG. 5(b) prior to training the system. The first model 205 is used to segment an input into units, where some of the units may be out of vocabulary characters which do not correspond to a unit in the vocabulary. The units are assigned the corresponding embedding 507. Units which are not in the vocabulary are assigned one of the K embeddings. During training, the embeddings 507 are optimised together with other parameters of the dual encoder network. During inference, only the input half of the dual-encoder is used to encode inputs, as responses are pre-computed.

During training, in step S01 input data and response pairs are received. In an embodiment, these are from a social media platform such as Reddit. However, any source of paired input data and responses could be used. Multiple sources could also be used. For example, a social media platform could be used in combination with a source of comments (which act as the input data) and responses supplied from an authorised source. For example, in the case of a looking for a restaurant, the comments and response could be supplied from reviews of the restaurant from social media and questions with answers supplied from the owner of the restaurant.

For example, all of Reddit is available as a public BigQuery dataset. In an embodiment, the 2016 and 2017 data was used. It was filtered to extract short comments, and extract pairs of comments and their responses. This gives around 200 million pairs. Ranking responses on Reddit was introduced by Al-Rfou et al. 2016., Conversational Contextual Cues: The Case of Personalization and History for Response Ranking, https://arxiv.org/pdf/1606.00372.pdf.

The comment is then processed in step S02 by the first model 205 to produce the sequence of embeddings for the comment and the response is processed in step S02 by the third model 703 to produce the sequence of embeddings for the response. The first model 205 and third model 703 convert input text into a list of units from the vocabulary V, and then replaces the units with the corresponding embeddings. Each item from V is assigned a randomly initialised D-dimensional embedding, which is then optimised during training.

In step S03, a dual encoder model 701 is trained. The dual encode model 701 comprises a context mapping network (comprising the first model 205 and the second model 207) and a conversational reply mapping network (comprising the third model 703 and the fourth model 705). An embedded representation for the response is the input to the fourth model 705 and an embedded representation for the comment is the input for the second model 207. The output of the second model is a context vector $h_X$, the output of the fourth model is a response vector $h_Y$.

The two networks are jointly trained by considering the similarity between $h_X$, and $h_Y$ in step S03 as described below. S(Y, X) is the score of a candidate reply Y given an input data X. This score is computed as a scaled cosine similarity of the context vector that represents the context, and the response vector that represents the candidate:

$$S(Y, X) = C \frac{h_Y \cdot h_X}{|h_Y||h_X|} = C \hat{h}_Y \cdot \hat{h}_X \quad (1)$$

where C is a learned constant, and $\hat{h}$ is h normalized to a unit vector.

Using a scaled cosine-similarity ensures that the scores are calibrated across training runs, which makes thresholding the scores easier.

During training, C is constrained to lie between 0 and $\sqrt{dimh}$ using an appropriate activation function. It is initialized to be between 0.5 and 1, and invariably converges to $\sqrt{dimh}$ by the end of training. Empirically, this helps with learning.

The reason to combine the cosine similarity with the learned scaling constant C is twofold:

1) without the scaling factor C, all similarity scores are crammed into the [−1; 1] interval which intuitively reduces the expressiveness of the model;

2) using the unconstrained dot product instead of cosine mitigates this problem, but introduces another problem: the dot products grow large in magnitude, pushing the softmax function into regions where it has extremely small gradients. Therefore, in order to control map the scores into a larger interval, but still to control the magnitude, the scaling factor C is introduced.

Empirically, the inventors have verified that the model that uses cosine with the scaling factor C outperforms variants which: 1) use dot-product only, or 2) use the cosine similarity without the scaling constant C.

In an embodiment, the loss function is used:

$$\Sigma_{i=1}^{N} S(Y_i, X_i) - \Sigma_{i=1}^{N} \log \Sigma_{j=1}^{N} \exp(S(Y_j, X_i)) \qquad (2)$$

Where $(Y_i, X_i)$ are pairs of responses and input data that go together in training, and N is the batch size. The loss function is used to train the parameters of the dual encoder model, meaning that the gradient of this loss with respect to each parameter of the dual encoder, including C, is determined using back-propagation, and then each parameter is updated using an optimiser function.

The matrix $S_{ij} = S(Y_j, X_j) = C[\hat{h}_{Y,1}, \hat{h}_{Y,2}, \ldots \hat{h}_{Y,N}] \cdot [\hat{h}_{X,1}, \hat{h}_{X,2}, \ldots \hat{h}_{X,N}]^T$ is inexpensive to compute, so this leads to an efficient loss function that maximises the score of pairs that go together in training, while minimising the score of random pairings.

The model hyper-parameters are specified in the code. Training is conducted for 24 hours, using several workers, for example 13 GPU workers (i.e. GPU nodes on one Tesla K80). This typically results in the model seeing around 5.5 million batches of 50 examples each.

If trained for the same amount of time, a smaller model can do quicker updates and traverse through the training data more times i.e., it can do more updates and reach convergence quicker. If the same number of updates is done, the more compact model will be trained much quicker—this means that it can reduce training resources. Having smaller models (in terms of their number of parameters and storage) also means that they are more memory efficient and can be stored on small devices (e.g., mobile phones, tablets) with limited memory storages.

At inference time, finding relevant candidates given a context reduces to computing $h_X$ for the context or user input X, and finding nearby $h_Y$ vectors. The $h_Y$ vectors can all be pre-computed and saved in a database (as described in relation to FIG. 2), and a nearest neighbour search can be optimized, giving an efficient search that can scale to billions of candidates for example. The fact that $h_Y$ vectors can all be pre-computed enables the use of external optimisation libraries (for example: https://github.com/facebookresearch/faiss) for nearest neighbours search that enable efficient search of a large pool of candidate responses. The optimisation of nearest neighbour search is a well-known problem in computer science and the above embodiment enables a direct implementation of readily available solutions.

The text features, the user input data and candidate responses, are represented using subwords, as described in relation to FIGS. 5(a) and 5(b). The tensorflow graph takes these text features as raw strings, and encodes all text preprocessing, tokenization, subword embedding and vocabulary look-up in the tensorflow graph itself. This allows for a simple API for using the model, where the user only needs to provide raw text.

In an embodiment, the restaurant browsing and booking system supports the discrete actions of restarting the conversation, and transferring to the slot-based booking flow. This is achieved using two binary intent classifiers, that are run at each step in the dialogue, as has been described above. In an embodiment, these intent classifiers make use of the already-computed $h_c$ vector that represents the users latest text. A single-layer neural network is learned on top of the 512-dimensional encoding, with a ReLu activation and 100 hidden nodes. In an embodiment, there are two dedicated binary classifiers which are fed by the 512-dimensional encodings, that is, they are learned on top of the output originating from layer 607.

For completeness, it is noted that the responses that are used in the training of the system might not be the same as the responses that can be retrieved during run time. Once the model has been trained, new responses that are more relevant to the area of use of the system (for example, restaurant review websites, etc) can be used either in addition to or instead of the responses used during training.

In an embodiment, the parameters of the dual encoder model, except for those of the final linear feed-forward layer, are shared between the input and response side. This allows for a further compression of the model during training when compared to a model variant which allocates separate parameters for the input text and for the responses. For example, the weights of the self-attention blocks 605 between the input and response encoding sub-networks are tied together so that fewer parameters have to be learnt. Where parameters are shared, only a single set of parameters is stored and updated, and these are used for the operations on the input and response side. Attention is shared between input and response in the dual-encoder network.

In particular, the subword embeddings of the first model 205 and the third model 703 are shared. These parameters may be shared because they are used to learn encodings of text in isolation by relying on the properties of the text that gets encoded. By sharing the parameters, the model size during training is reduced, so that fitting larger batches may be fed into GPU memory, thus speeding up the training process.

At least the parameters of the final linear feed-forward layer are not shared. This is to enable explicit differentiation between inputs and responses at later stages of the network to better model their interaction. Empirically, it has been verified that this approach results in an improved model compared to a model where the parameters of the final linear feed-forward layer is also shared.

After training, the embeddings corresponding to each of the V subwords of the vocabulary are stored in a database with the corresponding subwords, together with the additional K embeddings, and the embeddings are simply retrieved during use.

A further training stage, involving fine-tuning may be performed. This is performed in the same manner as described above, where more input-response pairs specific to a particular domain are used as training data, to further optimise the parameters. Thus a two-step training approach may be followed, comprising 1) pre-training of a general response selection model on large conversational corpora; and 2) fine-tuning the large model on a particular task with less in-task data (e.g., Amazon product review search, e-banking, tourist information). During training, the dual encoder model jointly learns semantic representations of input sentences and responses.

Figure 9:
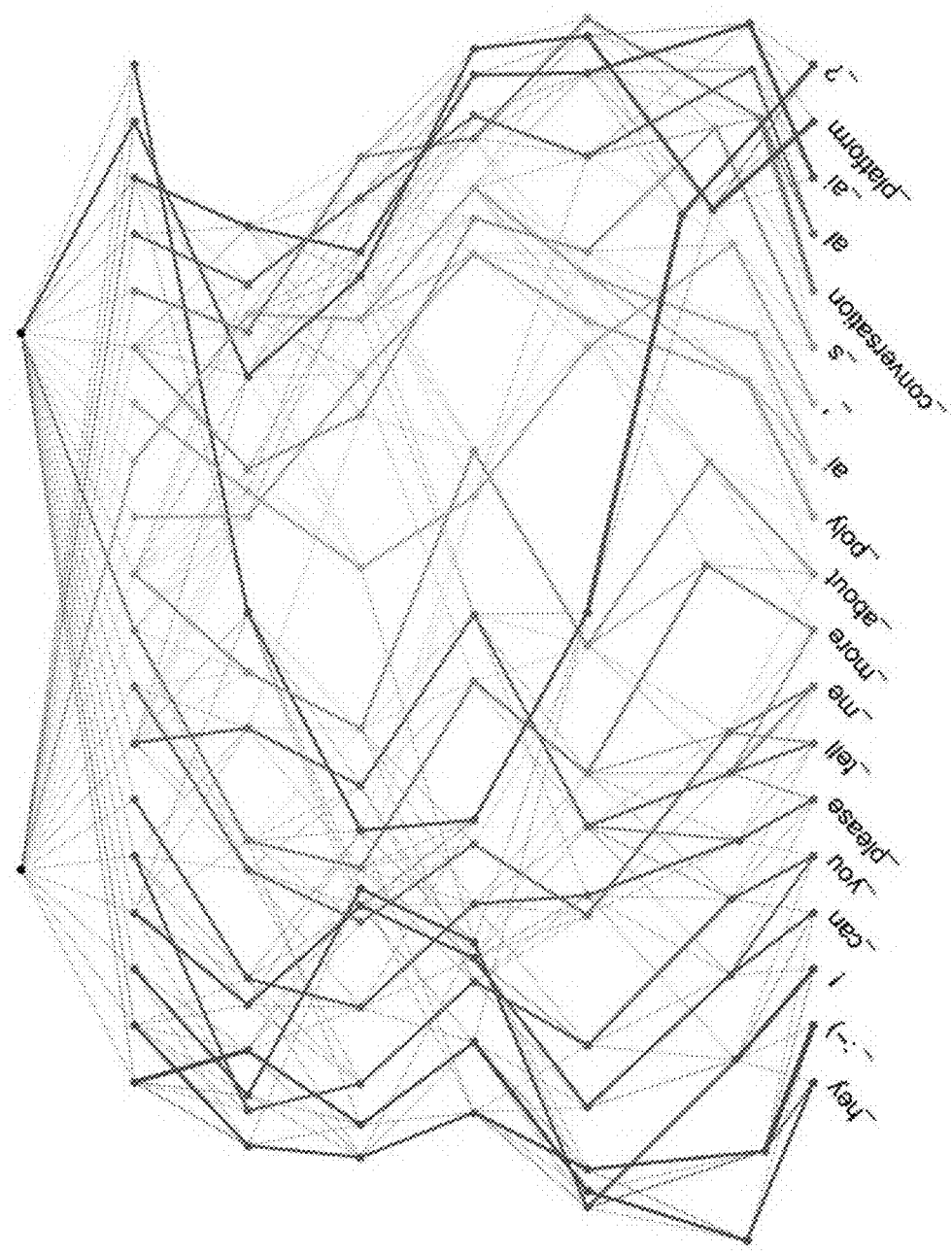
FIG. 9 is a schematic illustration of how an encoder which is used in a dialogue system in accordance with an embodiment learns to read a particular sentence with attention weights stressed.

A visualization of how the model learns to read a particular sentence with attention weights stressed is shown in FIG. 9. Each dot is a feed-forward computation depending on the attention-weighted inputs beneath it. The top two dots represent the final reduction layers, which compute attention-weighted sums over the sequence dimension. The input is roughly split into three meaningful chunks "hey :-)!". "can you please tell me more about", and "PolyAI's conversational AI platform?". The three chunks are processed almost independently near the bottom, combining further up.

As has been described above, in use, each element of the subword embeddings 507 is stored using a computer number format that occupies 8 bits in computer memory. The 8 bits are used to define 256 equally spaced buckets between a min value and a max value. The min and max values may be pre-specified as hyper-parameters. In an embodiment, the min and max values are updated throughout the training of the second model 207 with the goal that all the subwords embedding elements encountered are included within the min and max range. Hereinafter, representation using the above format will be referred to as 8-bit representation.

During the forward pass, although the embeddings are stored using the 8-bit representation to reduce the amount of memory occupied, they are converted to a floating point format, float 32, before being taken as input to the second model 207. The conversion from the 8-bit representation above to float 32 format may be performed by scaling and re-centering as has been described above. In an example, the 8-bit representation uses the int8 signed integer format however, any format that occupies 8 bit in memory could be used.

During training of the first model 205 and second model 207, jointly with the third 703 and fourth model 705, the min and max values are updated at every M batches. For example, M=500 or 1000. Updating comprises looking up the minimum and maximum values of the float 32 copies (described further below) of the embedding element values, and setting the new min and max values accordingly. For example, the min and max values may be set so that the width of the range (i.e. max-min) is within either 0.01 or 10% of the width of the range of the embedding element copies stored in the float 32 format. After training is complete, the float 32 copies of the embedding elements are discarded and the 8-bit representation of the learned embeddings, along with the updated value of (min, max) in float 32 format are stored.

The unit embeddings make up a large part of the stored model parameters, thus storing these with a reduced precision results in a significant reduction of model size. In an embodiment, by storing these embeddings using 8 bit precision instead of in IEEE 754 single precision format (also referred to as FP32 or float32), the model size may be reduced almost 4 times.

Various other parameters of the second model may also be stored using a computer number format that occupies 8 bits or 16 bits in computer memory. Optionally, an IEEE 754 16-bit (also referred to as FP16 or float16) half-precision format or an 8-bit representation of other network parameters may also be used. This allows the reduction of the model size slightly more, but the impact is less than for the embeddings.

The reduced precision is accounted for by various modifications used during training, which allows use of quantized parameters during inference, i.e. a lower-resolution copy of the parameters. Thus, a fully compressed model can be used during inference. Applying quantization to the dual-encoder during training allows reduction of the size of the model whilst maintaining accuracy. Rather than 32-bits per parameter, embedding parameters are represented using only 8-bits, and optionally other network parameters may be represented with 8 bits or 16 bits. The training is performed in a "quantization-aware" manner, by applying the following modifications to the training process.

Firstly, the training graph stores the parameters using float32 precision, computing gradient updates in that space. Thus the parameters of the dual encoder model, including the weights and embeddings, are stored in float 32, or single precision format.

During training, as has been described above, a query and a response are taken as the inputs to the dual encoder, and a forward pass performed. The forward pass is performed using reduced precision copies of the weights, as has been described previously. As described previously, a step of converting the embedding elements from 8-bit representation to float 32 format is performed before the sequence of embeddings is inputted to the second model 207 or the fourth model 705.

The activations (inputs to each layer in the second and fourth models) are stored using 16 bit (float16) representations, for use during back-propagation. The gradient of the loss with respect to each of the trainable parameters is then determined through back-propagation, using the stored activations, which were cached during the forward pass. The gradient of the loss with respect to each of the trainable parameters is stored using float16 format. The training may be performed in batches, resulting in an array of gradient values, each corresponding to a parameter, for each training example in the batch. These are converted to a single gradient value for each parameter (for example by taking the average of the gradient values for all training examples for the particular parameter). The gradient for parameter $\nabla J(x)$ is then used to calculate the updated parameter from the previous value using the optimizer function:

$$x = x - \eta \nabla J(x)$$

where $\eta$ is the learning rate and $x$ denotes a network parameter or embedding. The optimizer function takes the original parameter $x$, stored using 32 bit representations, and the gradient for the parameter $\nabla J(X)$, stored using float16 format. In the optimizer function, the gradient is multiplied by the learning rate $\eta$. The learning rate is a hyperparameter that has a small positive value. The result of this multiplication is stored using FP 32 and used to calculate the updated parameters, which are also stored using FP 32.

The updated parameters are then converted to the lower precision formats for use in the next training iteration. A function $f_1(x)$ is used to convert the stored float32 parameter $x$ into a step-quantized float16 representation, and a function $f_2(x)$ is used to convert the stored float32 parameter $x$ to the 8 bit representation in the case of the embedding elements. In an example, min=−0.1, and max=0.1. The inference graph saves the lower-resolution copy of $x$, that is, it uses $f(x)$ instead of $x$. Standard methods of converting from FP32 to FP16 may be used, for example the astype function of the Python numpy library can be used (https://docs.scipy.org/doc/numpy/reference/generated/numpy.ndar-ray.astype.html). For conversion from FP32 to 8-bit representation, the FP32 number is mapped to one of the $2^8$ values from min to max, and then this value is mapped to an integer number from 0 to 255 in the manner described previously.

Quantization of the embeddings and optionally other parameters is thus simulated during training, and the computations in the second or fourth model may be computed using FP16. Some operations such as softmax or reduce sum are carried out in float32, where they are numerically more stable, and then converted to float16. The inference graph uses the quantized parameters (that is, float16 for the parameters of the second and fourth model, and 8 bit representation for the embeddings of the first and third models). In the backward pass, $f_1'(x)=1:0$ is forced and the weights are shadowed with FP 32 versions so that the updates are fine-grained. Forcing $f_1'(x)=1.0$ means that the gradients computed in float16 are cast back to float32 and applied to the float32 parameter directly. $f_1'(x)$ is technically zero everywhere with discontinuities where $f_1(x)$ jumps.

By storing the result of the multiplication of the gradient by the learning rate using FP 32, a case where this result is too small to be represented in FP 16 or 8-bit representation is avoided. Furthermore, by computing the subsequent addition using FP 32, the case where the second term in the optimizer function is much smaller than the first term, and thus becomes zero when the addition operation is performed using FP 16 or 8 bit for the second term is avoided. Thus, while in principle all parameters could be represented by FP16, some operations, such as multiplying the gradient by the learning rate, are carried out in FP32 space to improve numerical stability and performance of the model.

During use, only the reduced precision copies of the parameters are stored, and the FP 32 versions are discarded. Thus the model size during use is reduced. During training, although the weights are also stored in FP 32, the activations are stored in reduced precision, thus reducing the overall memory required to perform the training. By representing the trainable parameters of the second and fourth models in FP16, the fact that GPUs (such as the Tesla K80) support operations in FP16 can be exploited. Use of FP16 has the effect of almost doubling the number of batches that can be fit into the GPU memory (compared to using FP32).

During training a float32 precision copy of each variable is used to accumulate gradients, but before it is used in the forward pass it is cast to float16, or 8 bit representation in the case of the embedding elements. Gradients then have float16 precision, but are multiplied by the learning rate in float32 space and used to update the training copy. For inference the model parameters (e.g. the embeddings) are stored using the relevant 8 bit/float 16 representation and may then be converted to float 32 when doing the various operations for each input.

Secondly, the loss value computed in the forward pass may be scaled, prior to the back-propagation being performed. The gradient of the loss with respect of each of the parameters $\nabla J(x)$ is used to calculate the updated parameter using the optimiser function. The gradient values tend to be small values, and may be too small to be represented using FP 16 or 8 bits. Scaling the loss value results in the gradient values calculated during back propagation being scaled by the same amount. Thus by scaling the loss values, the gradient values can be scaled such that they are representable in FP 16 or 8 bits. In an embodiment, the loss is scaled using a constant scaling factor. For example, the loss is scaled by a factor S and updates are then scaled by 1/S. In an example, S=128.0. The scaling factor allows the gradient computations to stay well represented by FP16 i.e., they will not get rounded to zero.

Thirdly, various operations in the forward pass and in the back propagation may be performed using different precision. In particular, operations involving sums of vectors or matrices may be carried out using FP 32. This includes, for example, the addition of the positional encoding vectors and the layer-normalisation step operations in the forward pass. Such operations may take reduced precision inputs and store reduced precision outputs, but the arithmetic is performed using FP 32. Point-wise operations, such as those performed in the self-attention layers, may be performed using FP 32, or FP 16. Vector dot product operations may be performed by storing each element product into FP 32 representation, before performing the addition step. A step of converting to a reduced precision for final storage is then performed.

In an embodiment, operations in the network are done with float16 precision, except a few such as softmax or reduce sum that are unstable in float16. These are done in float32 and then cast back to float16. Some operations in the graph are empirically determined to be performed using FP32 precision to be numerically stable including the layer normalization, L2-normalization, and softmax in attention layers.

The float16 computations in the training graph are accelerated by the CPUs tensor cores. The reduced data size allows fitting larger batches into GPU memory, thus speeding up the training process. As a result, the efficiency of training improves in terms of examples per second. The final model is not only smaller, but also reaches a higher accuracy after e.g. an 18 hour limit.

In summary, the mixed precision training may comprise one or more of the following steps:
1. Maintain a master copy of trainable parameters (weights of second and fourth model, and embeddings of first and third models) in FP32
2. For each training iteration:
    a. Make an FP16 copy of the weights, and an 8 bit representation copy of the embeddings
    b. Forward propagation
    c. Multiply the loss with the scaling factor S
    d. Backward propagation (FP16 weights, activations, and their gradients)
    e. Multiply the weight gradient with 1/S
    f. Complete the weight update and update the master copy of trainable parameters (in FP32 space), and then generate the reduced precision versions from the master copies.

Once training is completed, the learned parameters of the second model are saved in the inference graph in FP16 format and the embeddings of the first model are saved in the first model 205 using the 8-bit representation described above.

It is desirable to reduce the size of the response selection model 109, comprising the first model 205 and the second model 207, so that less memory is required to store the model. In particular, the responses and response vectors, unit embeddings, and weights and other parameters of the models must be stored in working memory when the model is executed. It may be desirable to use the response selection model 109 on a device with limited storage space such as a cell phone or tablet. Similarly, during training time, it is desirable to reduce the size of the dual encoder model, so that training may be performed more quickly. For example, through quantization, the batch size can be increased.

The first and second model are compressed using sub-word-level parameterisation and quantisation. Quantization of the stored embeddings, as well as optionally that of other neural network parameters, reduces model storage requirements. This also enables quicker and more efficient model training. The combination of these two compression techniques reduces the size of the model. Parameter sharing during training also contributes to the compression of the model in the training stage.

Response selection models may be evaluated using Recall@k. Given a set of N responses to the given input, where only one response is relevant, it indicates whether the relevant response occurs in the top k ranked candidate responses. RN@k is used as a measure, and where N is set to 100 and k is set to 1 this is referred to as R100@1. This effectively means that for each query, it is indicated if the correct response is the top ranked response between 100 candidates (1 correct+99 randomly sampled confounders).

The final score is the average across all inputs. The test data is based on the Reddit test data. A 1-out-of-100 score, represented by $R_{100}@1$ is used. A reference model which does not use 8 bit representation for the embeddings and FP16 for various model parameters has a size of 444 MB and an $R_{100}@1$ score of 61.3%. The reference encoder model has 111M parameters, 94% of which are the embeddings which encapsulate much of the model's ability to represent text sequences (Embedding parameters: 104M, Network parameters: 7M). Quantizing the model as described above results in a score of $R_{100}@1$=61.6%, with the model size is reduced from 444 MB to 118 MB. In summary, with 8 bit quantisation, approximately the same $R_{100}@1$ is obtained with a smaller model size. This may increase the speed of downloading the models from cloud storage for example. It further reduces the required space, both on disk and in memory. Moreover, such models may be adapted to multiple domains and languages, and scaling efforts are improved by smaller model sizes.

Using a model based on subword embeddings further reduces the model size, such that the embedding parameters are 16M, the network parameters are 13M (where a transformer architecture is used), giving an original model size of 116 MB, and a quantized model size of 59 MB.

The required storage (in bits) for the response selection model 109 in use has an additive term that scales linearly with:

The size of the representation of floats in the model (e.g. the weights of the various parts of the second model) P;

The hidden size of the token embeddings (D), e.g. 512 or 768 dimensions;

The vocabulary size (V), e.g., 800K words in English, generally the order of magnitude is $10^6$;

The number of separate embedding tensors (E), i.e., E=1+R, where the total number depends on R, the number of stored responses.

It is desirable to reduce the size whilst maintaining a similar level of performance, so that the model may be fit onto devices with limited storage for example without sacrificing performance, or even improving performance. This is achieved through using subword-level parameterisation as has been described above, and mixed-precision quantisation. Further reduction at training time can be achieved by parameter sharing between the models used to process the inputs and the responses.

Through the combination of the techniques, it is possible to reach a compression order which allows the model to be ported to limited-storage devices. FIG. 6(*b*) shows a high-level schema dissecting and illustrating the total storage requirements of the model at training time. The diagram also points to the different components where the model can be compressed.

As can be seen, reducing the vocabulary size reduces the storage requirements for the model. For example, replacing unigram and bigram vocabularies (order of magnitude $10^6$ or $10^7$ words) with subword-level vocabularies (order of magnitude $10^4$ units) reduces the storage requirements for the model. This also reduces storage requirements for the model during use, since the same vocabulary is stored.

Reducing the precision used to store the embeddings in the vocabulary, and optionally various parameters of the second model, also reduces storage requirements for the model at training time and during use.

Optionally, the embedding dimensionality D can also be selected to reduce the storage requirements. For example, reducing D from the 512 or 768 to lower-dimensional representations e.g., D=256 also reduces the storage requirements of the model, both at training time and during use. However, use of D<512 has been found to have an impact on the final response selection performance.

Various parameters of the dual encoder can be shared between the input side and the response side. For example, the number of separate embedding vectors used impacts the size of the model. Using the same embeddings for the inputs and the responses reduces the size of the model at training time.

A summary of how each of these techniques impacts the model compression is provided in Table 1. The compression mechanisms are orthogonal to each other and jointly contribute to the final compression order in a multiplicative manner (i.e., the final compression order can be seen as roughly ×4×25×R).

TABLE 1 a summary of compression orders achieved by combining the compression mechanisms on the dual-encoder model as described above.

| P | 32bit | 8bit | x4 |
|---|---|---|---|
| D | 512 or 768 | 512 or 768 (same) | None (as it affects performance)[1] |
| V | 1M (words) | 40K (subwords) | x25 |
| E | 1 + R (no sharing) | 1 (parameter sharing) | xR |

The compressed models may use less than 100 MB in storage. On the other hand, many encoders use greater than 1 GB.

In an example, the model comprises 16 M embedding parameters and 13M network parameters, and is 116 MB in size, reduced to 59 MB after quantization. A Reddit test performance of $R100@1$=64.9% is obtained. By reducing the model size, it can be possible to add additional parameters to the model for improved performance. For instance, by increasing the dimensionality of the inner layers in each FFN from 512 to 4*512=2,048, the model contains 19 M network parameters and its size before quantization is 174 MB. After weight quantization, the model gets reduced to 88 MB. This model further improves the $R100@1$ score from 64.9% to 66.9%. Replacing ReLU activation in FFNs with GeLU (Gaussian Error Linear Unit) produces a model of the same size (88 MB) and reaches the $R100@1$ score of 67.1%.

The retrieval-based dialogue system conducts conversations by selecting the most appropriate system response. The system encodes the input and a large set of responses in a joint semantic space. The system treats each input utterance as a query and retrieves the most relevant response from a large response collection by computing semantic similarity between the query representation and the encoding of each response in the collection. This task is referred to as response selection Response selection does not rely on explicit task-tailored semantics in the form of domain ontologies, which are hand-crafted for each task by domain experts. Response selection also differs from chatbot-style systems which generate new responses by generalising over training data, which may have the tendency towards generating universal but irrelevant responses such as "I don't know" or "Thanks". Response selection mitigates the need to engineer structured domain ontologies, and to solve the difficult task of general language generation. Furthermore, it may also be easier to constrain or combine the output of response selection models. This design may also bypass the construction of dedicated decision-making policy modules.

Models trained to select responses can be used to drive dialogue systems, question-answering systems, and response suggestion systems. The task of response selection provides a powerful signal for learning semantic representations useful for many downstream tasks in natural language understanding.

While certain embodiments have been described, these embodiments have been presented by way of example only, and are not intended to limit the scope of the inventions. Indeed the novel methods and apparatus described herein may be embodied in a variety of other forms; furthermore, various omissions, substitutions and changes in the form of methods and apparatus described herein may be made.

The invention claimed is:

1. A method of obtaining a response to a query inputted by a user, the method comprising:
   receiving a user inputted query;
   representing the user inputted query as a sequence of embedding vectors using a first model;
   encoding the sequence of embedding vectors to produce a context vector using a second model;
   retrieving responses with associated response vectors;
   scoring response vectors against the context vector, wherein the scoring is a measure of the similarity between the context vector and a response vector; and
   outputting the responses with the closest response vectors,
   wherein the first model is configured to segment a user inputted query into a sequence of units from a vocabulary of units and represent each unit in the sequence as an embedding vector,
   wherein at least one of the units in the vocabulary is an incomplete word, and wherein the first model comprises parameters that are stored using eight bits per parameter; and
   wherein the second model has been trained using corresponding queries and responses such that an encoding is used that maximises the similarity between the response vector and context vector for a corresponding query and response.

2. A method according to claim 1, wherein:
   the user inputted query is received on a first device comprising a local memory; and
   the parameters of the first model and the second model are stored on the local memory.

3. A method according to claim 1, wherein one or more of the parameters of the second model are stored using a 16-bit floating point representation.

4. A method according to claim 1, wherein the first model and the second model are less than 1 GB in size.

5. A method according to claim 1, wherein there are 30 000 to 50 000 units in the vocabulary.

6. A method according to claim 1, wherein the parameters of the first model that are stored using eight bits per parameter are the elements of the embedding vectors.

7. A method according to claim 1, wherein the elements of the embedding vectors representing each unit in the sequence are converted to a higher precision representation before being input to the second model.

8. A method according to claim 1, wherein the first model is configured to segment the user inputted query by:
   segmenting the user inputted query into words, and
   matching units from the vocabulary to parts of each word, starting with the longest units.

9. A method according to claim 1, wherein the second model comprises a transformer network.

10. A method according to claim 1, wherein the second model comprises a repeated module comprising a self-attention layer, a layer-normalization step, a feedforward neural network and a further layer-normalization step.

11. A method according to claim 1, wherein the second model comprises a positional encoding layer.

12. A method according to claim 1, wherein the second model comprises a multi-attention layer.

13. A method of training a response retrieval system to provide a response to a query inputted by a user, the method comprising:
   providing a set of training data, wherein the training data set comprises queries and corresponding responses;
   representing each query as a first sequence of vectors using a first model, wherein the first model is configured to segment an inputted query into a sequence of units from a vocabulary of units and represent each unit in the sequence as an embedding vector, wherein at least one of the units in the vocabulary is an incomplete word, and wherein the first model comprises parameters that are stored using eight bits per parameter;
   encoding each first sequence of embedding vectors to produce a context vector using a second model;
   representing each response as a second sequence of vectors using a third model, wherein the third model is configured to segment an inputted response into a sequence of units from the vocabulary of units and represent each unit in the sequence as an embedding vector, wherein the third model uses at least some of the parameters of the first model;
   encoding each second sequence of embedding vectors to produce a response vector using a fourth model; and
   jointly training the first and second models, and the third and fourth models using the condition that the similarity between the context vector and the response vector is higher for a corresponding response and query and that the similarity between the context vector and the response vector is lower for a random response and query.

14. A method of training according to claim 13, wherein, the at least some of the parameters of the second model are stored using a 16-bit floating point representation.

15. A method of training according to claim 13, wherein the parameters of the first model that are stored using eight bits per parameter and that are shared with the third model are the elements of the embedding vectors.

16. A method of training according to claim 13, wherein the fourth model uses at least some of the parameters of the second model.

17. A method of training according to claim 13, wherein the parameters of the first model have a value between a minimum value and a maximum value, and wherein the minimum value and the maximum value are adjusted during training.

18. A method of training according to claim 17, wherein the parameters of the first model have a value equal to one of 256 values equally spaced from the minimum value to the maximum value, and wherein each of the 256 values is mapped to an integer from 0 to 255 which is represented by 8 bits.

19. A dialogue system for obtaining a response to a query inputted by a user, the system comprising:
   an input for receiving a user inputted query;
   a processor, configured to:
      represent the user inputted query as a sequence of embedding vectors using a first model, wherein the first model is configured to segment a user inputted query into a sequence of units from a vocabulary of units and represent each unit in the sequence as an embedding vector, wherein at least one of the units in the vocabulary is an incomplete word;

encode the sequence of embedding vectors to produce a context vector using a second model, wherein the second model has been trained using corresponding queries and responses such that an encoding is used that maximises the similarity between the response vector and the context vector for a corresponding query and response;

retrieve responses with associated response vectors;

score response vectors against the context vector wherein the scoring is a measure of the similarity between the context vector and a response vector; and select the responses with the closest response vectors, an output, configured to output speech or text corresponding to the selected responses; and a local memory, configured to store a plurality of parameters of the first model using eight bits per parameter.

20. A carrier medium comprising computer readable code configured to cause a computer to perform the following for obtaining a response to a query inputted by a user:

receiving a user inputted query;

representing the user inputted query as a sequence of embedding vectors using a first model;

encoding the sequence of embedding vectors to produce a context vector using a second model;

retrieving responses with associated response vectors;

scoring response vectors against the context vector, wherein the scoring is a measure of the similarity between the context vector and a response vector; and outputting the responses with the closest response vectors, wherein the first model is configured to segment a user inputted query into a sequence of units from a vocabulary of units and represent each unit in the sequence as an embedding vector, wherein at least one of the units in the vocabulary is an incomplete word, and wherein the first model comprises parameters that are stored using eight bits per parameter; and wherein the second model has been trained using corresponding queries and responses such that an encoding is used that maximises the similarity between the response vector and context vector for a corresponding query and response.

* * * * *